(12) United States Patent
Marsland et al.

(10) Patent No.: US 10,623,142 B2
(45) Date of Patent: Apr. 14, 2020

(54) METHOD FOR DETERMINING AN ENCODING SCHEME AND SYMBOL MAPPING

(71) Applicants: Ian Marsland, Ottawa (CA); Reinhard Balogun, Ottawa (CA); Ramy Gohary, Ottawa (CA); Halim Yanikomeroglu, Ottawa (CA); Ngoc Dung Dao, Ottawa (CA); Nimal Gamini Senarath, Ottawa (CA)

(72) Inventors: Ian Marsland, Ottawa (CA); Reinhard Balogun, Ottawa (CA); Ramy Gohary, Ottawa (CA); Halim Yanikomeroglu, Ottawa (CA); Ngoc Dung Dao, Ottawa (CA); Nimal Gamini Senarath, Ottawa (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 226 days.

(21) Appl. No.: 15/175,675

(22) Filed: Jun. 7, 2016

(65) Prior Publication Data
US 2017/0126354 A1    May 4, 2017

Related U.S. Application Data

(60) Provisional application No. 62/248,974, filed on Oct. 30, 2015.

(51) Int. Cl.
*H04L 1/00*    (2006.01)
*H04L 1/20*    (2006.01)

(52) U.S. Cl.
CPC ............ *H04L 1/007* (2013.01); *H04L 1/0009* (2013.01); *H04L 1/0041* (2013.01); *H04L 1/203* (2013.01); *H04L 1/0021* (2013.01)

(58) Field of Classification Search
CPC ... H04L 1/0009; H04L 1/0057; H04L 1/0041; H04L 1/0071; H04L 1/007; H04L 1/203; H04L 1/0021; H03M 13/35
(Continued)

(56) References Cited

U.S. PATENT DOCUMENTS

| | | | |
|---|---|---|---|
| 7,669,103 B2* | 2/2010 | Soljanin | H04L 1/0002 |
| | | | 714/751 |
| 8,185,797 B2* | 5/2012 | Jun | G11B 20/18 |
| | | | 714/758 |

(Continued)

OTHER PUBLICATIONS

International Search Report and Written Opinion dated Nov. 17, 2016 for International Patent Application PCT/IB2016/053413 filed on Jun. 9, 2016.

(Continued)

*Primary Examiner* — Albert Decady
*Assistant Examiner* — Enam Ahmed

(57) ABSTRACT

According to embodiments, there is provided a method apparatus for determining an encoding scheme for transmission of encoded data across a communications channel. The method includes determining the encoding scheme at a design Signal-to-Noise Ratio and evaluating a Frame Error Rate of the encoding scheme. If the FER is not within a target range, the method further includes modifying the encoding scheme until the evaluated FER is within the target range. There is further provided a method and apparatus for mapping bit labels to a plurality of symbols in a constellation, wherein the constellation are organisable into a plurality of sets and each bit label includes a plurality of bit positions. The method includes determining a distance metric between sets and merging pairs of sets according to the distance metric. The method further includes assigning a value to a bit position for bit labels of symbols in the merged set.

23 Claims, 22 Drawing Sheets

(58) Field of Classification Search
USPC .......................................................... 714/774
See application file for complete search history.

(56) References Cited

U.S. PATENT DOCUMENTS

| | | | |
|---|---|---|---|
| 8,300,716 B1 | 10/2012 | Lee et al. | |
| 8,615,699 B2* | 12/2013 | Eroz | H03M 13/1137 714/758 |
| 8,689,083 B2* | 4/2014 | Nguyen | H03M 13/036 714/774 |
| 8,689,084 B1* | 4/2014 | Tai | H03M 13/112 714/24 |
| 2004/0071363 A1* | 4/2004 | Kouri | G06K 9/00516 382/276 |
| 2005/0128935 A1* | 6/2005 | Tang | H04L 1/0003 370/208 |
| 2006/0268880 A1* | 11/2006 | Zhao | H04L 1/1812 370/394 |
| 2007/0162827 A1* | 7/2007 | Walton | H04L 1/06 714/774 |
| 2007/0286313 A1* | 12/2007 | Nikopour-Deilami | H04L 1/005 375/341 |
| 2008/0279092 A1 | 11/2008 | Hassan et al. | |
| 2012/0079355 A1* | 3/2012 | Patapoutian | G06F 11/1048 714/780 |
| 2013/0159817 A1* | 6/2013 | Carlach | H04L 1/0057 714/776 |
| 2014/0164881 A1* | 6/2014 | Chen | G11C 16/00 714/773 |
| 2014/0211579 A1* | 7/2014 | Lovelace | G11C 11/40607 365/200 |
| 2015/0333775 A1* | 11/2015 | Korb | H03M 13/45 714/780 |
| 2016/0294418 A1* | 10/2016 | Huang | H03M 13/13 |
| 2017/0118062 A1* | 4/2017 | Loghin | H04L 27/3405 |

OTHER PUBLICATIONS

Pedarsani, R., Hamed Hassani, S., Tai, I. and Tleltar, E., "On the construction of polar codes", IEEE International Symposium on Information Theory, Aug. 2011.
Gohary, R., El-Azizy, M., and Davidson, T., "A bicm-idd scheme for noncoherent mimo communication," IEEE Trans. Wireless Commun, vol. 8, No. 2, pp. 541-546, Feb. 2009.
Ungerboeck, G., "Trellis-coded modulation with redundant signal sets part i: Introduction," IEEE Communicaitons Magazine, vol. 25, pp. 5-11, Feb. 1987.
Seidl, M., Schenk, A., Stierstorfer, C. and Huber J., "Multilevel polar-coded modulation," in IEEE International Symposium on Information Theory, Jul. 2013, pp. 1302-1306.
Gohary R., and Davidson T., "Non-coherent mimo communication: Grassmannian constellations and efficient detection," IEEE Trans. Inf. Theory, vol. 55, No. 3, pp. 1176-1205, Mar. 2009.
Balogun, Philip R., Marsland Ian, Goohary, Ramy and Yanikomeroglu, Halim, "Polar codes for noncoherent MIMO signalling", IEEE International Conference on Communications (ICC) 2016, May 23-27, 2016, Kuala Lumpur, Malaysia.

* cited by examiner

Initialize $S_{l,i} = \{i\}$, $M_l = 1$, $D(i,j)$ for $l = 1, 2, \ldots, \log_2 M$ $\Delta = \min_i \max_j D(i,j)$ ⟵——— Find min of max distance (step 1130)

for $i = 1, 3, \ldots, M_l - 1$ $j = \arg\min_{x: x \neq i, D(i,x) \leq \Delta} D(i,j)$ ⟵——— Find set to pair with $i$ (step 1140)

$S_{l+1,(i+1)/2} = S_{l,i} \cup S_{l,j}$ ⟵——— Merge sets $i$ and $j$ $S_{l+1,(i+1)/2} = S_{l,i}$, $B_{l,i} = 0 \forall a \in S_{l,i}$ $B_{l,a} = 1 \forall a \in S_{l,j}$ ⟵——— Label sets (step 1150)

swap row $j$ of $D$ with row $i+1$ swap column $j$ of $D$ with column $i+1$ $D(i,j) = \min\{D(2i, 2j), D(2i, 2j+1), D(2i+1, 2j), D(2i+1, 2j+1)\}$, $\forall i,j$ ⟵——— Calculate inter-set distances

| $\mathcal{D}_2$ | 1,11 | 3,9 | 5,15 | 7,13 | 4,10 | 2,12 | 8,14 | 6,16 |
|---|---|---|---|---|---|---|---|---|
| 1,11 | 0 | 4 | 2 | 2 | 2 | 2 | $2\sqrt{2}$ | $2\sqrt{2}$ |
| 3,9 | 4 | 0 | 2 | 2 | 2 | 2 | $2\sqrt{2}$ | $2\sqrt{2}$ |
| 5,15 | 2 | 2 | 0 | 4 | $2\sqrt{2}$ | $2\sqrt{2}$ | 2 | 2 |
| 7,13 | 2 | 2 | 4 | 0 | $2\sqrt{2}$ | $2\sqrt{2}$ | 2 | 2 |
| 4,10 | 2 | 2 | $2\sqrt{2}$ | $2\sqrt{2}$ | 0 | 4 | 2 | 2 |
| 2,12 | 2 | 2 | $2\sqrt{2}$ | $2\sqrt{2}$ | 4 | 0 | 2 | 2 |
| 8,14 | $2\sqrt{2}$ | $2\sqrt{2}$ | 2 | 2 | 2 | 2 | 0 | 4 |
| 6,16 | $2\sqrt{2}$ | $2\sqrt{2}$ | 2 | 2 | 2 | 2 | 4 | 0 |

| $\mathcal{D}_3$ | 1,11,3,9 | 5,15,7,13 | 4,10,2,12 | 8,14,6,16 |
|---|---|---|---|---|
| 1,11,3,9 | 0 | 2 | 2 | $2\sqrt{2}$ |
| 5,15,7,13 | 2 | 0 | $2\sqrt{2}$ | 2 |
| 4,10,2,12 | 2 | $2\sqrt{2}$ | 0 | 2 |
| 8,14,6,16 | $2\sqrt{2}$ | 2 | 2 | 0 |

| $\mathcal{D}_1$ | 1,11,3,9,<br>8,14,6,16 | 4,10,2,12,<br>5,15,7,13 |
|---|---|---|
| 1,11,3,9,<br>8,14,6,16 | 0 | 2 |
| 4,10,2,12,<br>5,15,7,13 | 2 | 0 |

FIG. 14F

METHOD FOR DETERMINING AN ENCODING SCHEME AND SYMBOL MAPPING

CROSS-REFERENCE TO RELATED APPLICATIONS

This application claims the benefit of U.S. Provisional Application Ser. No. 62/248,974 titled "SYSTEMS AND METHODS FOR SET PARTITIONING AND MULTI-LEVEL POLAR ENCODING FOR COMMUNICATION NETWORKS" filed on Oct. 30, 2015, which is incorporated by reference herein in its entirety.

FIELD OF THE INVENTION

The present invention pertains to the field of communication networks, and more particularly towards systems and methods for determining an encoding scheme and symbol mapping that may be used for communication networks.

BACKGROUND

Communications networks, including wireless communications networks, may utilize channel coding and error correction techniques to reduce the incidence of errors and improve reliability when transmitting signals between nodes. A transmitting node may encode a signal to include certain redundancies according to an error-correcting code. If any errors appear in the signal at the receiving node, it may use the redundancies to correct the signal without requiring re-transmission. Channel coding and error correction techniques can be applied to situations where the cost of re-transmission is unfeasible, such as in one-way communication links where it is not possible for a receiver to request re-transmission of a signal from the transmitter. While increasing the amount of redundancies helps to improve signal reliability, it comes at the expense of reducing the effective bandwidth of information that is transmitted. Accordingly, efficient and versatile channel coding and error correction schemes are desired.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and method for symbol mapping and determination of an encoding scheme.

According to embodiments, there is provided a method for determining an encoding scheme for transmission of encoded data across a communications channel. The method includes determining the encoding scheme for operation at a design Signal-to-Noise Ratio (SNR) and evaluating a Frame Error Rate (FER) of the encoding scheme. If the FER is not within a predetermined target range, the method further includes modifying the encoding scheme until the evaluated FER is within the predetermined target range.

According to embodiments, there is provided a method for mapping bit labels to a plurality of symbols in a constellation, the constellation organisable into a plurality of sets each corresponding to a symbol of the plurality of symbols. Each bit label includes a plurality of bit positions, and each symbol is for transmission across a communications channel. The method includes determining a distance metric between sets and merging pairs of sets according to the distance metric. The method further includes assigning a value to a bit position for bit labels of symbols in the merged set. Determining, merging and assigning can be iteratively repeated until the constellation comprises a single subset.

According to embodiments, there is provided a network node for determining an encoding scheme for transmission of encoded data across a communications channel. The network node includes a processor and a memory couple to the processor. The memory has instructions stored therein, that when executed by the processor causes the network node to determine the encoding scheme for operation at a design Signal-to-Noise Ratio (SNR); evaluate a Frame Error Rate (FER) of the encoding scheme; and modify the encoding scheme until the evaluated FER is within a predetermined range to a target FER.

According to embodiments, there is provided a network node for mapping bit labels to a plurality of symbols in a constellation, the constellation organisable into a plurality of sets each corresponding to a symbol of the plurality of symbols, wherein each bit label comprises a plurality of bit positions, and each symbol is for transmission across a communications channel. The network node includes a processor and a memory couple to the processor. The memory has instructions stored therein, that when executed by the processor causes the network node to determine a distance metric between sets, merge pairs of sets according to the distance metric and assign a value to a bit position for bit labels of symbols in the merged set. The executed instructions can further cause the network node to determine, merge and assign iteratively.

BRIEF DESCRIPTION OF THE FIGURES

Further features and advantages of the present invention will become apparent from the following detailed description, taken in combination with the appended drawings, in which:

FIG. 12 is an example of pseudo code representative of the method in FIG. 11, according to an embodiment;

Figure 14C:
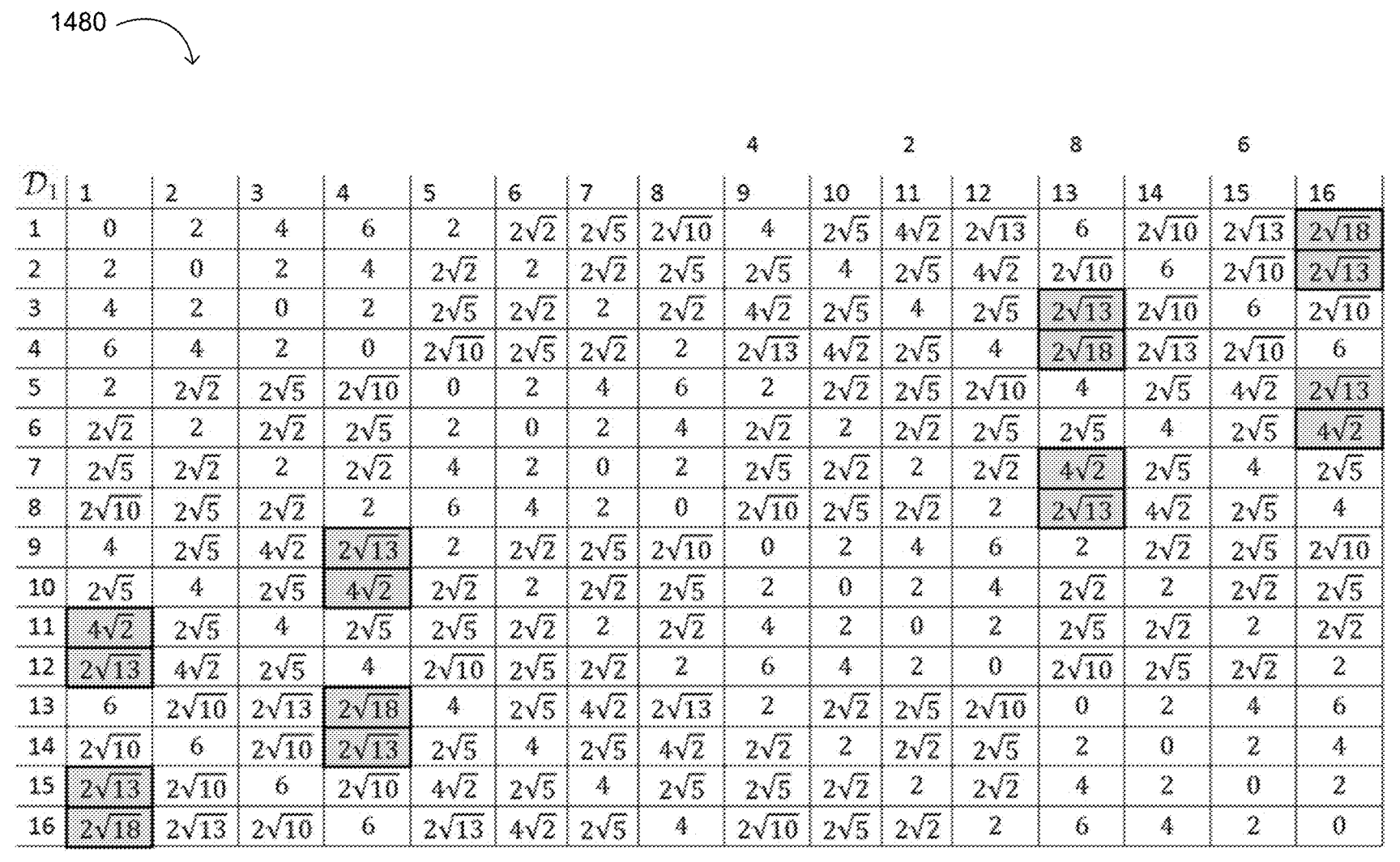

FIGS. 14A-14F is another constellation for illustrating the method of FIG. 9, according to another embodiment.

It will be noted that throughout the appended drawings, like features are identified by like reference numerals.

DETAILED DESCRIPTION

Figure 1:
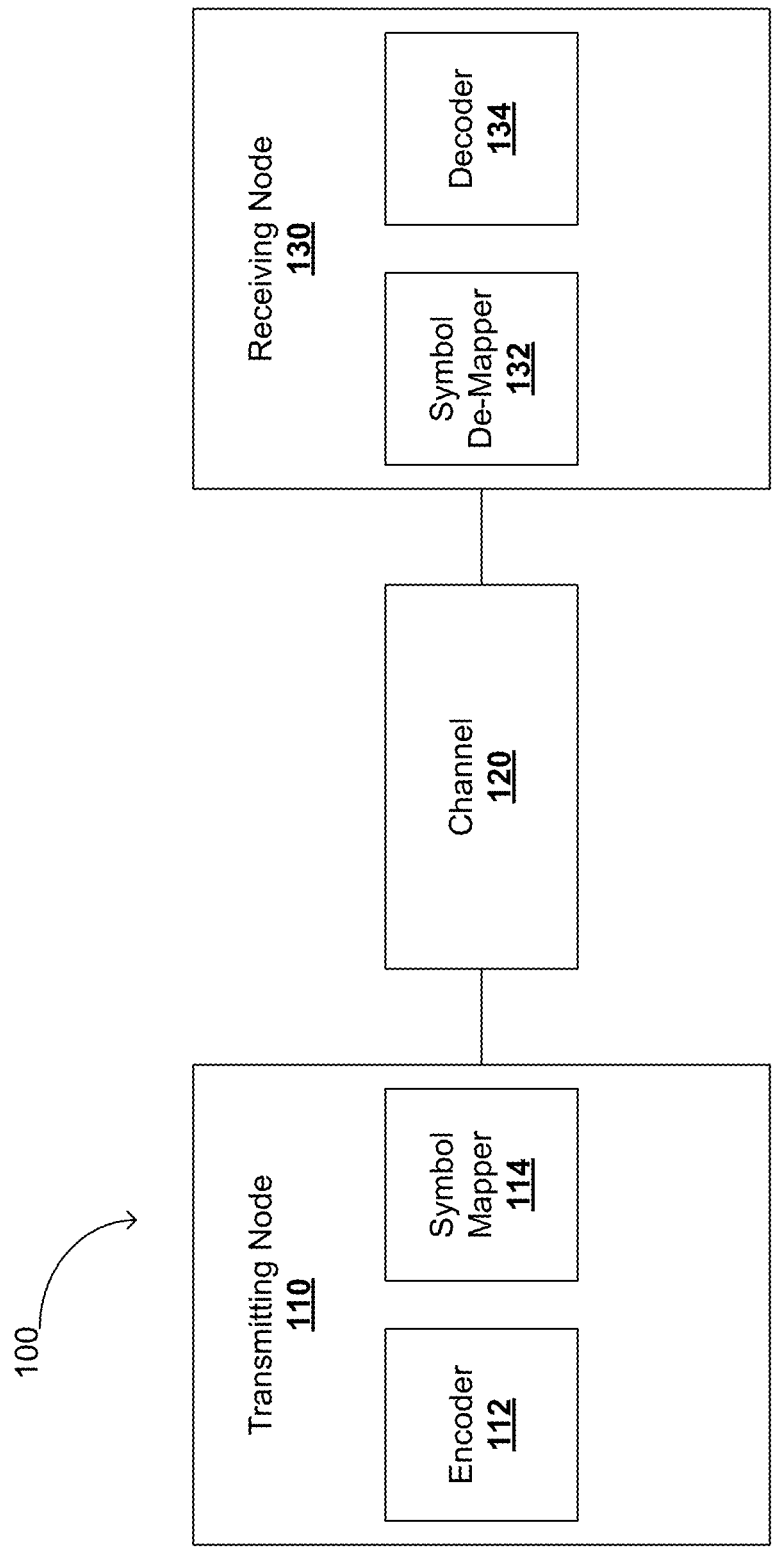
FIG. 1 is a schematic diagram of a communications network according to an embodiment.

Referring to FIG. 1, there is shown a communications network 100 according to an embodiment. The communications network 100 includes a transmitting node 110, a channel 120, and a receiving node 130, and may be used for transmitting information from the transmitting node 110 to the receiving node 130 across channel 120. The transmitting node 110 comprises an encoder 112 which converts information node 110 wishes to transmit into encoded bits, and a symbol mapper 114 that maps/converts the encoded bits into corresponding symbols according to a mapping derived from a constellation. The symbols are then transmitted across channel 120, which may comprise any suitable transmission medium for transmitting signals between nodes 110 and 130. For example, channel 120 may include wired, wireless, broadcast, radio frequency, optical channels, and so forth. The receiving node 130 comprises a symbol de-mapper 132 which converts the received symbols back to encoded bits, and a decoder 134 which then converts the encoded bits to recover the original information sent from the transmitting node 110.

Encoder 112 may incorporate channel coding, modulation, and error correction techniques in order to improve the reliability of the signal transmitted across channel 120 and received by receiving node 130. To this effect, encoder 112 may provide certain redundancies to informational bits, so that it may be recovered by the receiving node 130 when needed. For example, encoder 112 may utilize polar codes, Trellis Coded Modulation (TCM), Bit-Interleaved Coded Modulation (BICM), and Multi-Level Coding (MLC) schemes, in certain embodiments.

Figure 2:
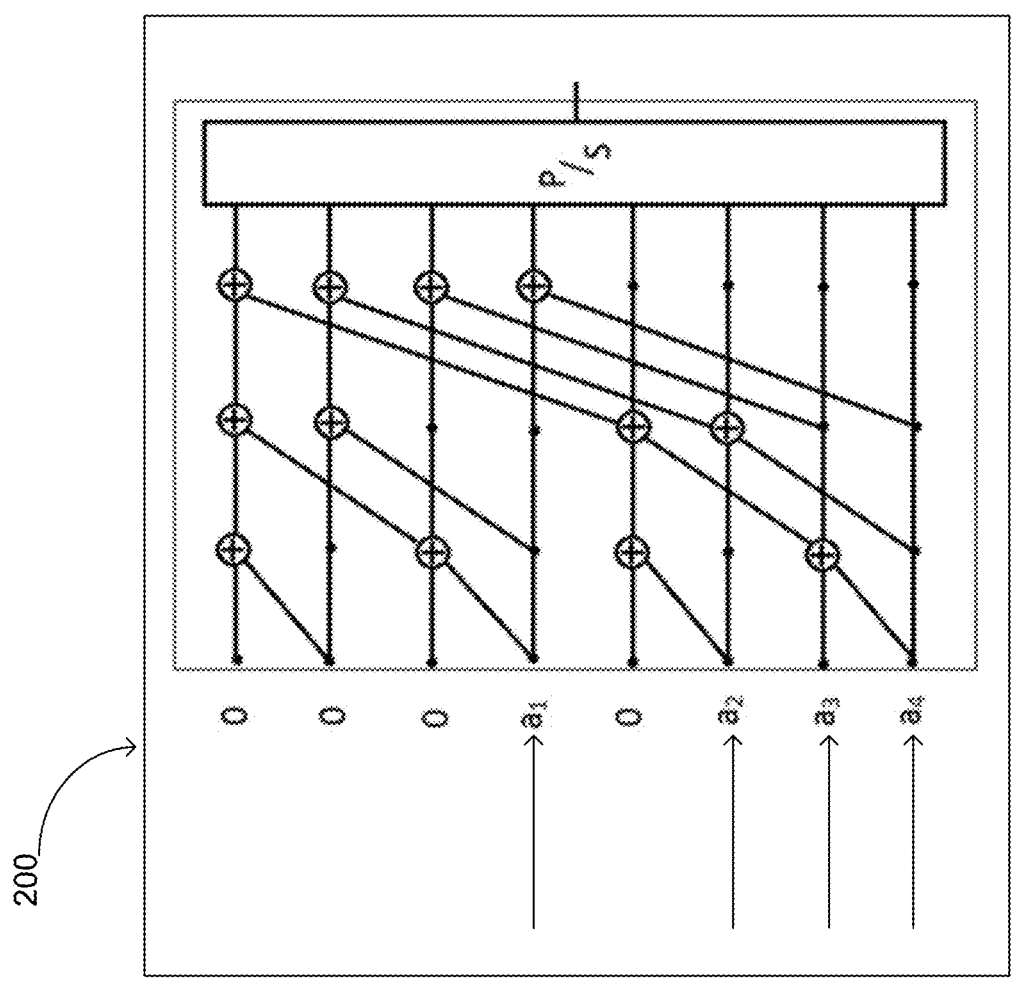
FIG. 2 is a schematic diagram of a polar encoder, according to an embodiment.

Referring to FIG. 2, there is shown a schematic diagram of an encoder 200 utilizing polar codes, which may comprise encoder 112 of FIG. 1 in certain embodiments. As shown, encoder 200 utilizes a polar coding scheme which receives 4 parallel input bits ($a_1$, $a_2$, $a_3$, $a_4$), and 'freezes' 4 bit channels (i.e. blocks the input bit channels shown as "0" on the left side) to provide specific redundancies in place of those bit channels within an encoded 8 bit serial output The 'frozen' bit channels may be chosen according to bit positions in a transmitted signal which exhibit a greater probability of error, and may thus be used for transmitting redundancies relating to input bits ($a_1$, $a_2$, $a_3$, $a_4$). Accordingly, encoder 200 may be used to transform an original 4 bit information set, to an encoded serial 8 bit stream having 4 redundancy bits that may be used for signal recovery. The number of input/output bits, and positions of 'frozen' bit channels for carrying input bit redundancies, may vary according to different polar coding schemes, which in turn would affect the overall code rate R and code design of encoder 200.

Figure 3:
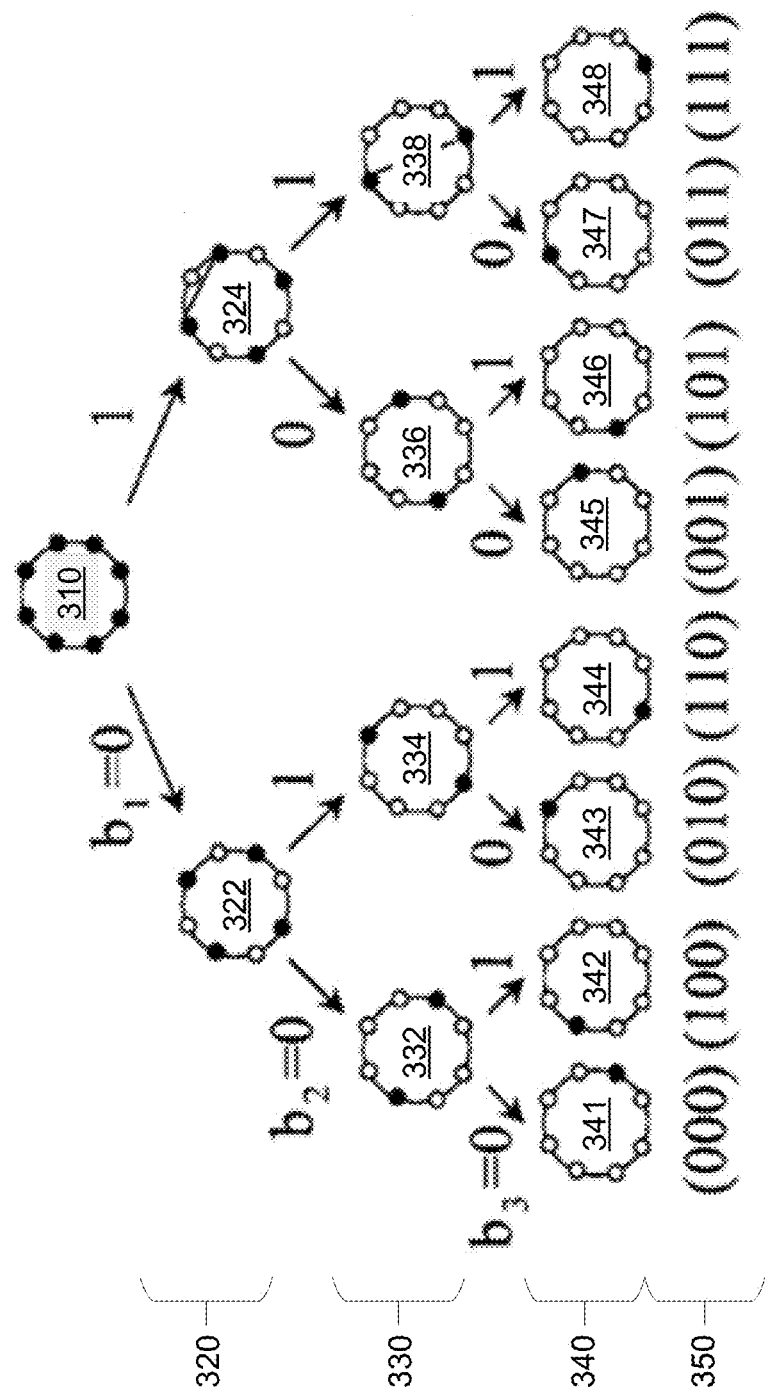
FIG. 3 illustrates set partitioning of an 8-PSK (Phase Shift Keying) constellation using recursive subdivision, according to an embodiment.

Referring to FIG. 3, there is shown an example of 2-dimensional set partitioning of an 8-PSK (Phase Shift Keying) constellation 310 using recursive subdivision, to determine a mapping of bit labels 350 to symbols, according to an embodiment. The determined mapping may be utilized by Symbol Mapper 114 of FIG. 1 in order to convert encoded bits into symbols that are transmitted across channel 120, for example. As shown in FIG. 3, the constellation 310 comprises a single set of eight symbols (represented by the eight solid dots), which needs to be recursively partitioned into individual sets comprising a single symbol each, in order to assign a unique bit label to single symbol in the set. In the example shown in FIG. 3, each bit label comprises 3-bit positions ($b_1$,$b_2$,$b_3$), wherein a value (0 or 1) is assigned to one of the bit positions $b_1$,$b_2$,$b_3$ for bit labels of each symbol in a subset, upon partitioning. In this way, constellation 310 is recursively subdivided into smaller subsets groups 320, 330, until the individual symbols are isolated in subset group 340 to provide unique bit labels 350 assigned thereto. Symbols in each divided subset will have a larger minimum distance between symbols than in their parent set. The larger the distance between subsets, the easier it would be for a receiver to distinguish between symbols, thus reducing the probability of error.

For further illustration in FIG. 3, in the first subset group 320, the eight symbols of constellation 310 are divided into two subsets 322, 324 having four symbols each, and a value of 0 is assigned to the first bit position $b_1$ for the bit labels of the symbols in subset 322 ($b_1$=0), and a value of 1 for the first bit position $b_1$ of the bit labels of the symbols in subset 324 ($b_1$=1). For the second group of subsets 330, subsets 322, 324 above having four symbols each are further subdivided into subsets 332, 334, 336, and 338 each having 2 symbols each, and the second bit position $b_2$ for of the bit labels for symbols in each subset 332, 334, 336, and 338 correspondingly assigned as shown. Upon the final subdivision to arrive at the third subset group 340, the individual symbols are isolated and finally assigned the third bit position $b_3$ for the bit labels for symbols in each subset 341, 342, 343, 344, 345, 346, 347, 348. Unique bit labels 350 are thus determined by the values assigned to each of $b_1$,$b_2$,$b_3$ for each symbol in subsets 341, 342, 343, 344, 345, 346, 347, 348 through the above process of recursive subdivision and assigning bit position values.

Figure 4:
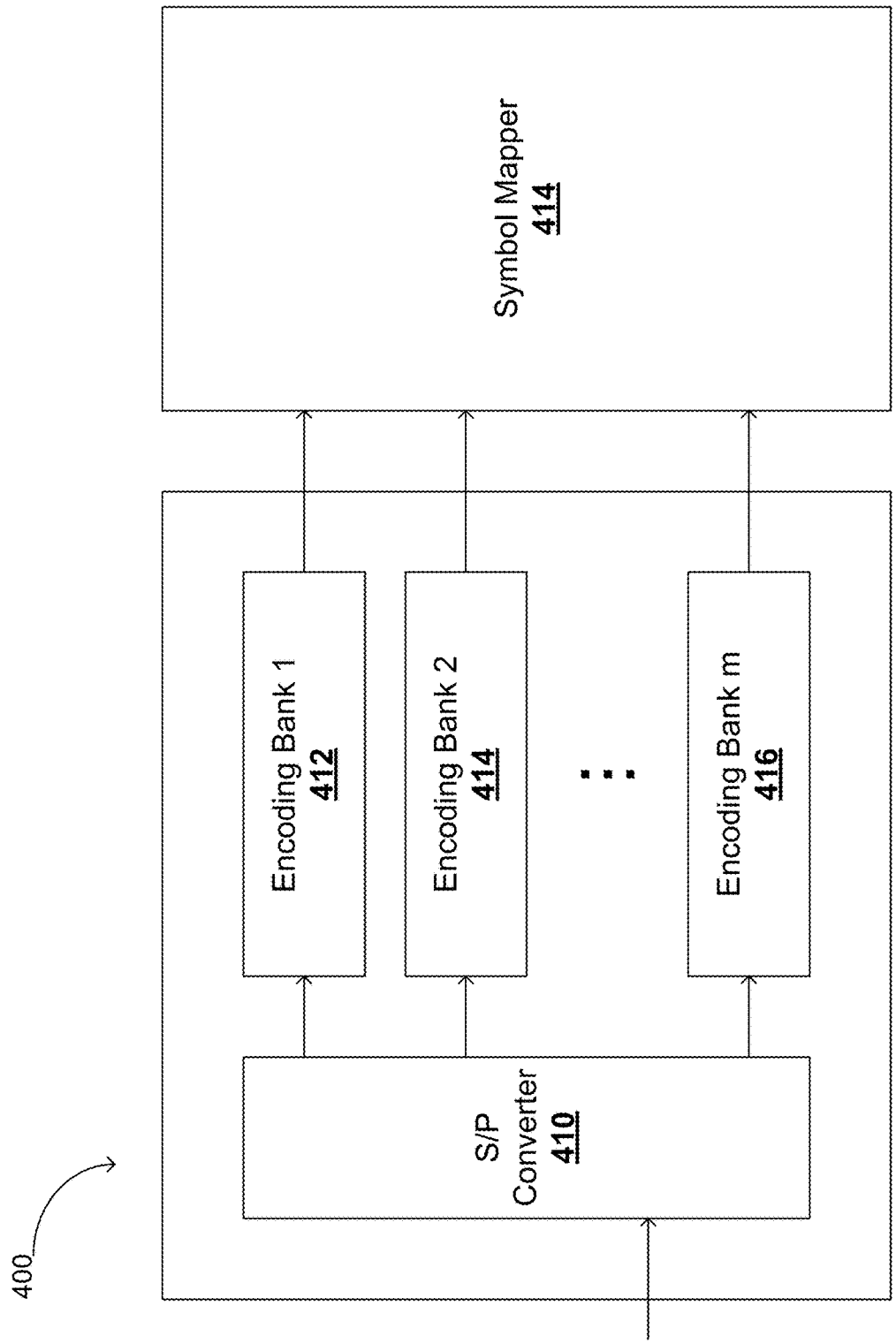
FIG. 4 is a schematic diagram of a multi-level encoder, according to an embodiment.

Referring to FIG. 4, there is shown a schematic diagram of a multi-level encoder 400 communicatively coupled to symbol mapper 114, according to an embodiment. Encoder 400 comprises a serial to parallel (S/P) converter 410, and m encoding banks including encoding banks 412, 414, and 416. Each of the encoding banks 412, 414, and 416 may comprise a polar encoder (such as encoder 200 of FIG. 2, for example) operating under a specific polar sub-code $SC_1 \ldots SC_m$ that may result in different encoding rates for each encoding bank. The number of encoding banks m may also be selected according to the number of bits to be grouped/mapped to a symbol in a constellation. For example, m=$\log_2$ M encoding banks may be used for a constellation size M utilized by symbol mapper 114. In this way, an output code bit from each of encoding banks 412, 414, and 416 may be mapped to a bit position to determine a symbol for transmission. For example, an output code bit from encoding bank 412 may be mapped to the first bit position of a symbol, an output code bit from encoding bank 414 may be mapped to the second bit position of a symbol, and an output code bit from encoding bank 416 may be mapped to the $m^{th}$ bit position of a symbol, in order for symbol mapper 114 to determine an appropriate symbol for transmission.

One advantage of the multi-level encoding scheme used by multi-level encoder 400, is that it can selectively exploit the reliabilities of different bit positions of symbols in a constellation. For example, redundancies may be added for bit positions having lower reliabilities through sub-codes $SC_1 \ldots SC_m$ of each encoding bank 412, 414, and 416 to achieve corresponding individual code rates $R_1 \ldots R_m$ which match the reliabilities of the different bits positions. The overall code rate R of encoder 400 may thus be determined by $$R = \frac{1}{m}\sum_{i=1}^{m} R_i,$$

through careful selection of the individual sub-codes $SC_1 \ldots SC_m$ operating on encoding banks 412, 414, and 416.

Figure 5B:
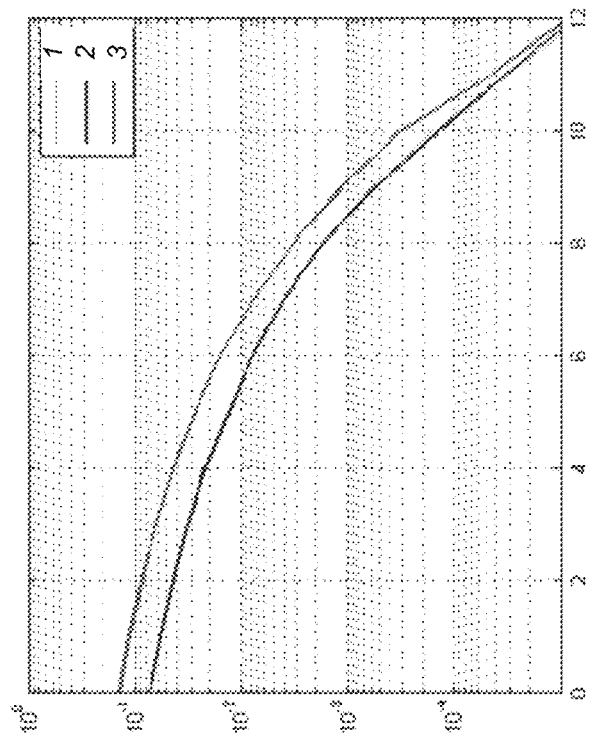
FIGS. 5A-5B illustrate bit error rates associated with individual bits in a transmitted symbol when derived through set partitioning (FIG. 5A) and gray labelling (FIG. 5B), according to an embodiment.
Figure 5A:
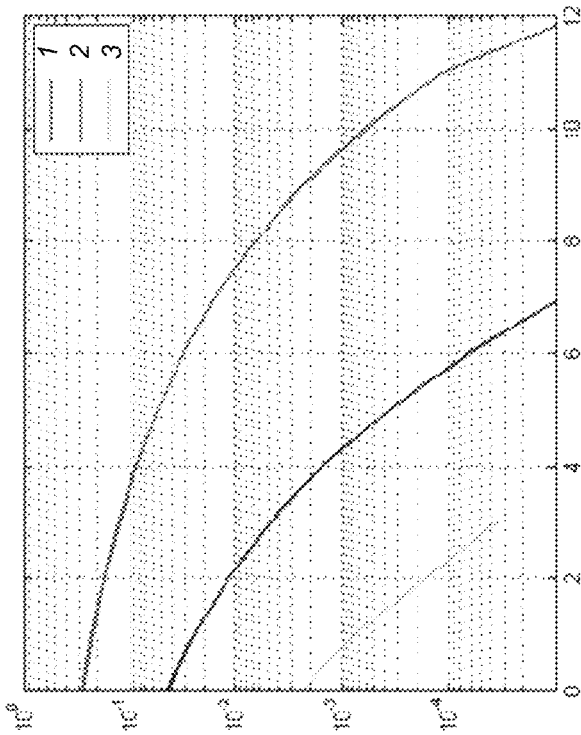

FIGS. 5A-5B illustrate bit error rates associated with individual bits in a transmitted symbol when derived through set partitioning (FIG. 5A) and gray labelling (FIG. 5B), according to an embodiment. As shown in FIG. 5A, each bit (1,2,3) exhibits a discernibly different probability of error when set partitioning is performed. This is in contrast to FIG. 5B, where each bit exhibits relatively similar bit error rates over the given range. Accordingly, application of set partitioning helps discriminate bit error rates associated with different bit positions of a transmitted symbol. Using this information for example, encoding banks 412, 414, 416 of encoder 400 may selectively add redundancies to those bits of a symbol exhibiting greater bit error rate probabilities to compensate for potential transmission errors.

While application of the multi-level encoder 400 of FIG. 4 may be more or less applicable for regular 2-dimensional constellations, such those involving QAM (Quadrature Amplitude Modulation) or PSK (Phase Shift Keying) having smaller constellation sizes and correspondingly smaller bit transmission lengths, its application cannot be easily extended towards irregular, and multidimensional constellations, that would be suited for applications involving encoding schemes such as Golden Codes, and Grassmannian Signalling. Moreover, as the number of transmission bits increases (for larger constellation sizes), the determination of the individual sub-codes $SC_1 \ldots SC_m$ of each encoding bank, including the decision of which bit redundancies to add, and how to encode them, becomes increasingly complex. This renders difficult effective implementation of an efficient polar coding scheme for use with irregular and multidimensional constellations.

Figure 6:
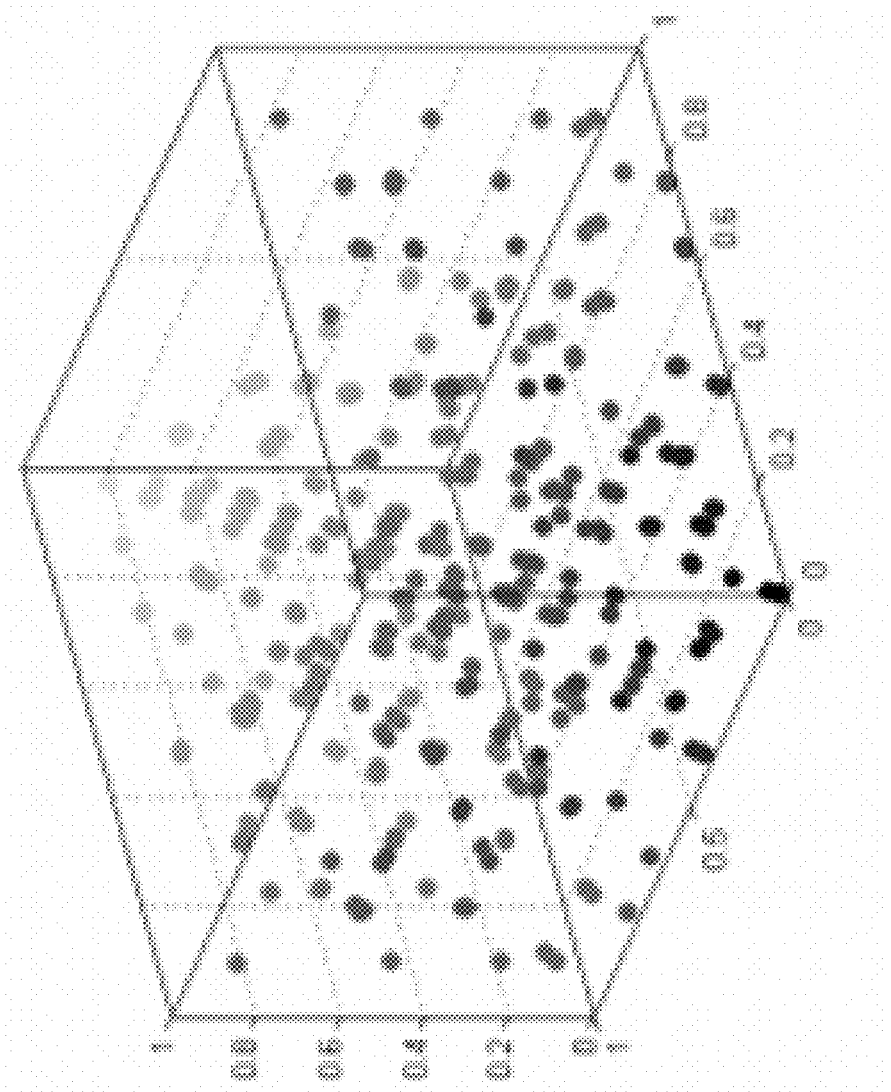
FIG. 6 illustrates a 3-dimensional irregular constellation, according to an embodiment.

Additionally, performing set partitioning through application of recursive subdivision, such as that illustrated through FIG. 3, does not easily extend to irregular and multidimensional constellations, such as that shown in FIG. 6. For example, it is not a straight forward endeavor to determine how to subdivide the constellation in FIG. 6 given the non-symmetric and irregular structure, which renders difficult subdivision and tracking of successive subsets in order to perform bit labelling for respective symbols of the constellation. The use of irregular and/or multi-dimensional signal constellations may provide superior performance, and are well suited for use with encoding schemes such as Golden Codes and Grassmannian Signalling. Accordingly, systems and methods for set partitioning of irregular multidimensional constellations, and for performing multi-level encoding for use with irregular multidimensional constellations, are desired.

Figure 7:
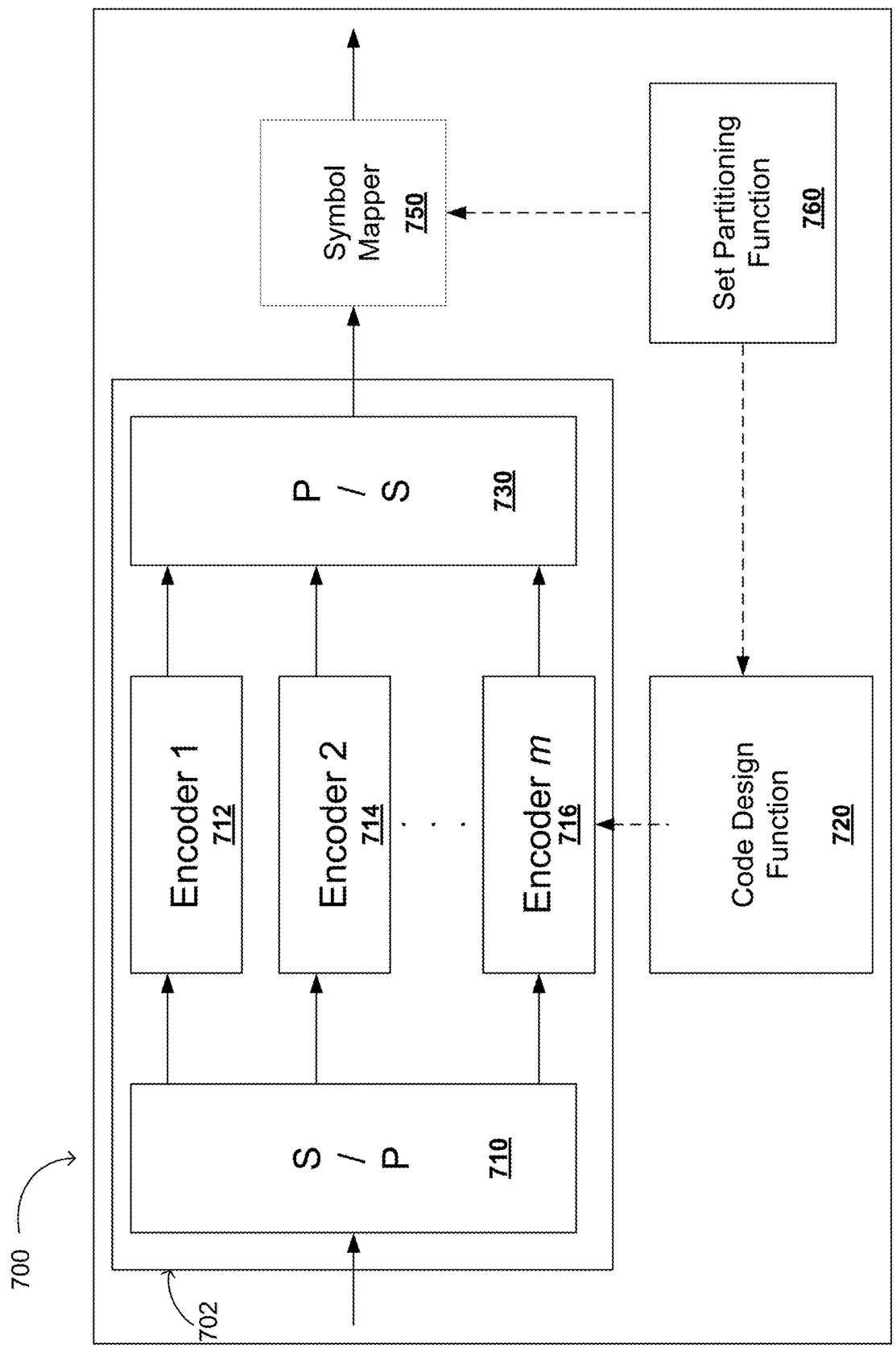
FIG. 7 illustrates a functional schematic of a communications node, according to an embodiment.

Referring to FIG. 7, there is shown a functional schematic of a communications node 700 according to an embodiment of the present invention. Communications node 700 includes an encoder 702, a code design function 720, symbol mapper 750, and a set partitioning function 760 communicatively inter-coupled as shown. The encoder 702 comprises a multi-level encoder having an S/P converter 710, m different encoding banks including encoding banks 712, 714, and 716 and a P/S converter 730. The code design function 720 is configured to provide an coding scheme C comprising individual sub-codes $SC_1 \ldots SC_m$ to each respective encoding bank 712, 714, and 716, that achieves a desired overall code rate R having individual code rates $R_1 \ldots R_m$ which improve transmission reliability and error correction capabilities when mapped to transmitted symbols. For example, each of the individual sub-codes $SC_1 \ldots SC_m$ may selectively add redundancies to bit positions having lower reliabilities, in a way that reduces bit error probabilities during transmission. The set partitioning function 760 is configured to partition a constellation, such as an irregular or multidimensional constellation, in order to provide a mapping to symbol mapper 760, which then converts encoded bits from encoder 702 into symbols of the constellation. Accordingly, code design function 720 and set partitioning function 760 have a symbiotic functional relationships with encoder 702 and symbol mapper 750, respectively, in determining an overall encoding and symbol mapping scheme which improves transmission reliabilities and performance in certain wireless transmission applications.

Figure 8A:
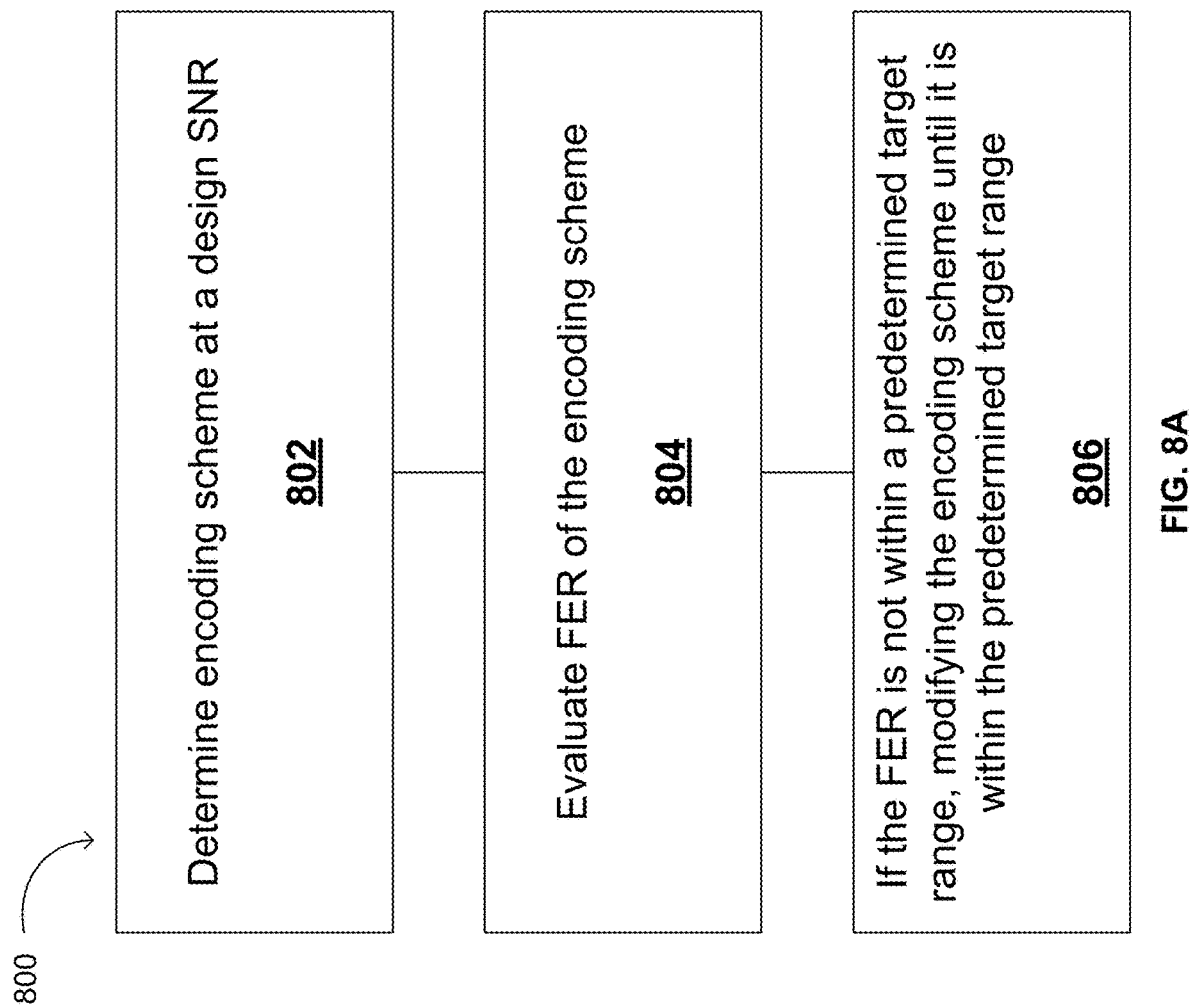
FIG. 8A is a flow chart illustrating a method for determining an encoding scheme for transmission of encoded data across a communications channel, according to an embodiment.

Referring to FIG. 8A, there is shown a flow chart illustrating a method 800 for determining an encoding scheme for transmission of encoded data across a communications channel, according to an embodiment. Method 800, for example, may be applied by the code design function 720 of FIG. 7, in order to determine individual sub-codes of encoding banks 712, 714, and 716, to selectively encode information to be mapped to symbols of a constellation, and transmitted over a channel. At step 802, an encoding scheme is determined for a design Signal-to-Noise Ratio (SNR($\gamma_D$)). Examples of determining an encoding scheme with polar codes may be found for example in "On the construction of polar codes", by R. Pedarsani, S. Hamed Hassani, I. Tal, and E. Teletar (IEEE International Symposium on Information Theory, August 2011). At step 804, a Frame Error Rate (FER) is evaluated for the encoding scheme. At step 806, if the FER is not within a predetermined target range, the encoding scheme is modified until the evaluated FER is within the predetermined target range (to a target FER). In certain embodiments this may include evaluation of the encoding scheme, and re-itteration of steps 802 and 804, as will be discussed below.

As an illustrative example, when method 800 is applied by code design function 720 of FIG. 7 for determining an encoding scheme for encoder 702, the encoding scheme would include the individual sub-codes $SC_1 \ldots SC_m$ corresponding to each respective encoding bank 712, 714, and 716. In determining the encoding scheme in step 802 for example, each sub-code $SC_1 \ldots SC_m$ specifies 'frozen' bit channels within each encoding bank (so that they may alternatively be used to transmit redundancies for non-frozen channels), based on an overall code rate R for the design SNR($\gamma_D$). For example, bit channels of the encoding banks 712, 714, and 716 having higher error probabilities may be 'frozen', and the number of 'frozen' bit channels may be selected by (1−R)mN, where R is the overall code rate, and N is the sub-code codeword length. As understood by persons skilled in the art of error coding, the code word is the sequence of bits produced by an encoder, and the message word is the sequence of bits fed into the encoder. The number of subcodes may be represented by m=$\log_2$ M. The determination of which bit channels to 'freeze' and the number of 'frozen' bit channels, can be made through simulation of a number of transmitted message frames at the design SNR($\gamma_D$) in order to determine error probabilities associated with each bit channel (similar to that shown in FIG. 5A). The individual code rates $R_1$ . . . $R_m$ of the encoding banks 712, 714, and 716 results from the number of input (non-frozen) bit channels determined from each sub-code $SC_1$ . . . $SC_m$. In this way, system performance of encoder 702 is dependent on the design SNR($\gamma_D$).

In certain embodiments, the transmitted message frames (for determining which bit channels to 'freeze') are determined using the mapping from the set partitioning function 760, to determine those bit channels which have a relatively higher probability. Those bit channels may then be frozen in the associated encoding bank 712, 714, and 716, and alternatively be used for transmitting redundancies for other bits. The transmitted message frames may be performed through simulation, or empirical testing over the communications channel, at the design SNR.

In certain embodiments, bits channel having the highest, or relatively higher error probabilities, are frozen. The number of frozen bit channels may comprise (1−R)mN, where R is the overall code rate, and N is the subcode word length, and m=$\log_2$ M is the number of subcodes. In this way, the more "reliable" bit channels, that display a relatively lower bit error rate, remain in use for transmission.

The design SNR($\gamma_D$) is chosen such that it may result in an encoding scheme that is within the predetermined target range of the target FER. For example, if the encoding scheme is designed at an SNR that is too high or too low, it may yield a code that requires a needlessly high SNR to achieve the target FER. Reaching the target FER reduces the number of re-transmissions and/or discarded packets in real time systems, improving overall transmission efficiency.

In certain embodiments, method 800 further includes: comparing the evaluated FER to the target FER; replacing the design SNR with a new design SNR if the evaluated FER is outside the predetermined range to the target FER; and iteratively repeating the steps of: determining the encoding scheme, evaluating the FER, and modifying the encoding scheme.

In certain embodiments, the design SNR is between a low limit SNR and a high limit SNR, and modifying the encoding scheme further comprises: comparing the evaluated FER to the target FER; updating the design SNR with the low limit SNR when the evaluated FER is greater than the target FER; updating the design SNR with the high limit SNR when the evaluated FER is lower than the target FER; determining whether the absolute difference between the high limit SNR and the low limit SNR is less than a predetermined tolerance; and when the absolute difference between the high limit SNR and the low limit SNR is greater than the predetermined tolerance, iteratively repeating the steps of: determining the encoding scheme, evaluating the FER, and modifying the encoding scheme.

In certain embodiments, the design SNR is selected to be a median value between the low limit SNR and the high limit SNR. The low limit SNR and the high limit SNR are also predetermined values selected in accordance with the communications channel.

In certain embodiments, the encoding scheme is for application with a multilevel polar encoder comprising a plurality of encoding banks, and determining the encoding scheme comprises determining a plurality of sub-codes each corresponding to one of the plurality of encoding banks. Each of the plurality of sub-codes may determine frozen bit channels within each encoding bank. The frozen bit channels may correspond to bit channels having relatively higher error probabilities upon transmission of the encoded data.

In certain embodiments, the encoding scheme is for a polar encoder comprising a plurality of bit channels, and determining the encoding scheme comprises selectively freezing one or more of the plurality of bit channels of the polar encoder. The method may further comprise transmitting message frames representative of encoded bits from the polar encoder to determine the one or more of the plurality of bit channels to selectively freeze. The message frames may be determined from a mapping provided by a set partitioning function.

Figure 8B:
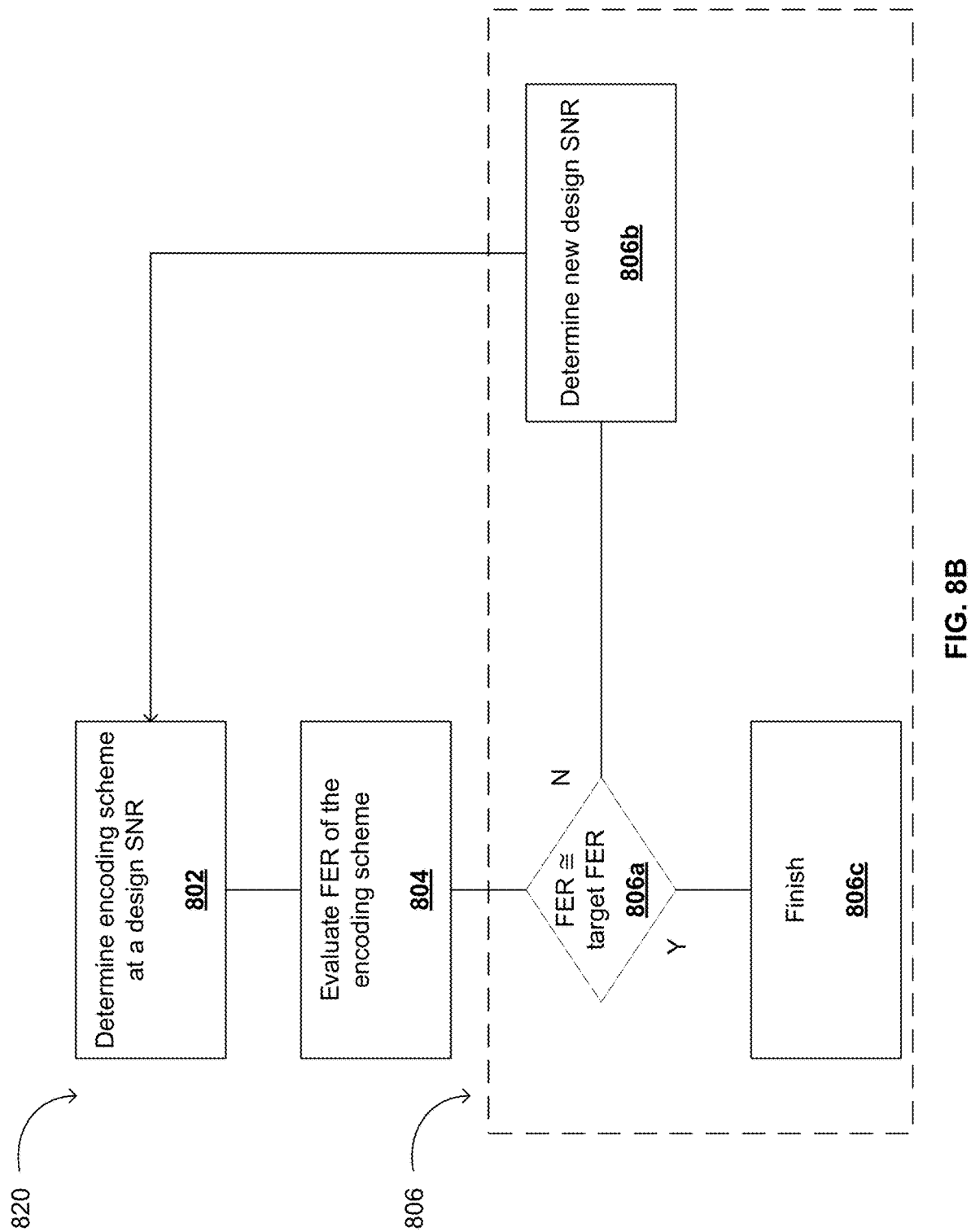
FIG. 8B is a flow chart illustrating a method for determining an encoding scheme, according to another embodiment.

Referring to FIG. 8B there is shown a flow chart illustrating a method 820 for determining an encoding scheme, according to an embodiment. Method 820 is similar to method 800 above, except in that step 806 comprises additional sub-steps as will be described below. At step 802, an encoding scheme is determined for a design SNR($\gamma_D$). At step 804, a FER is evaluated for the encoding scheme. At step 806, the encoding scheme is modified until the evaluated FER is within a predetermined range to a target FER; this step comprises comparing the evaluated FER to the target FER to determine if they are substantially close (step 806a), such as within the predetermined target range. If yes, modification of the encoding scheme is finished (step 806c) and method 820 ends. If no, then a new design SNR($\gamma_{D'}$) is selected (step 806b), and method 820 then repeats at step 802 using the new design SNR($\gamma_{D'}$). Accordingly, Method 820 can iteratively repeat by varying the design SNR($\gamma_D$), and empirically testing the FER of the resultant encoding scheme, until an appropriate encoding scheme is determined with having a desired FER. The acceptable tolerance in step 806a (e.g. target range) may be within 10% of the target FER, but this may vary in certain embodiments depending on the intended system design and tolerance allotted. The target FER may be set through system design for a given cell site or other wireless coverage area, for example.

Figure 8C:
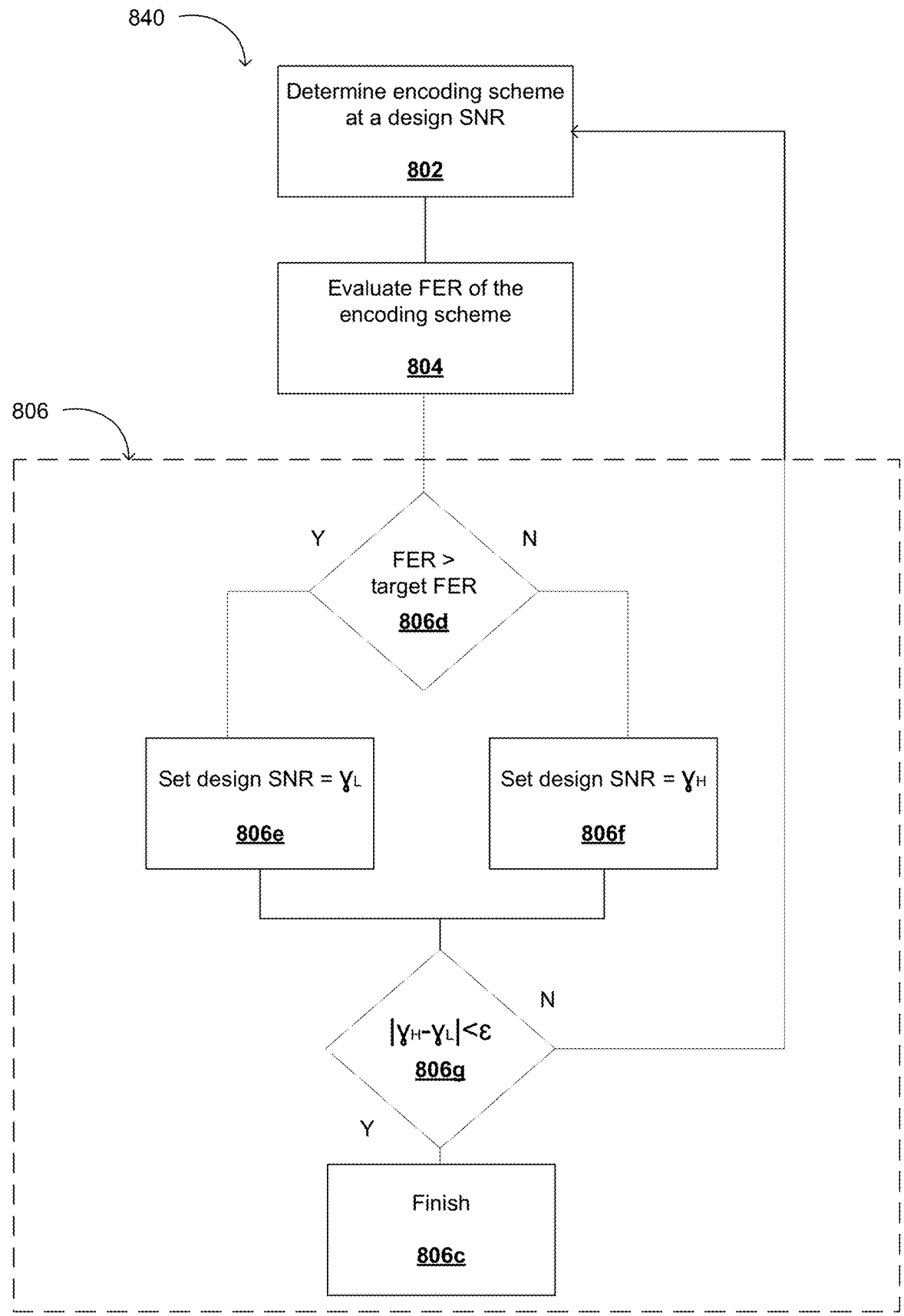
FIG. 8C is a flow chart illustrating a method for determining an encoding scheme, according to another embodiment.

Referring to FIG. 8C there is shown a flow chart illustrating a method 840 for determining an encoding scheme, according to an embodiment. Method 840 is similar to method 800 above, except in that step 806 comprises a bisection method as will be described below. At step 802, an encoding scheme is determined for a design SNR($\gamma_D$), which is between a low limit SNR($\gamma_L$) and high limit SNR($\gamma_H$). For example, the low limit SNR($\gamma_L$) and high limit SNR($\gamma_H$) may be predetermined given the design of the communications network or channel, and the design SNR($\gamma_D$) may be the average of these limits ($\gamma_D=[\gamma_L+\gamma_H]/2$). At step 804, a FER is evaluated for the encoding scheme. According to embodiments, FER can be evaluated by physical experimentation with a real physical channel or computer simulation of the communication system or theoretical evaluation using mathematical models or other manner as would be readily understood. According to embodiments, FER is evaluated by testing performed on a physical system, wherein the testing can be an automated sequence of steps performed by the system itself, based on a defined algorithm, thereby providing for the automated determination of FER on a periodic or as need basis. A worker skilled in the art would readily understand the implementation criteria and requirements for such automated evaluation of FER.

At step 806, the encoding scheme is modified until the evaluated FER is within a predetermined range to a target FER; this step comprises comparing the evaluated FER to the target FER (step 806*d*), and if the evaluated FER is higher, the low limit SNR($\gamma_L$) is updated to the design SNR($\gamma_D$) (i.e. $\gamma_L = \gamma_D$). Otherwise, if the evaluated FER is lower than the target FER, the high limit SNR($\gamma_H$) is updated to the design SNR($\gamma_D$) (i.e. $\gamma_H = \gamma_D$). Then at step 806*g*, the absolute difference between the high limit SNR($\gamma_H$) and low limit SNR($\gamma_L$) is compared to a tolerance($\varepsilon$); if the difference is within the tolerance, then modification of the encoding scheme is finished (step 806*c*) and method 840 ends. If not, method 840 repeats at step 802 using the updated design SNR($\gamma_D$) set in steps 806*e* or 806*f*. In this way, the design SNR used to determine the encoding scheme, is iteratively adjusted through updating the low limit SNR($\gamma_L$) or high limit SNR($\gamma_H$) via bi-section, until it provides an FER having an acceptable range to the target FER.

Figure 9:
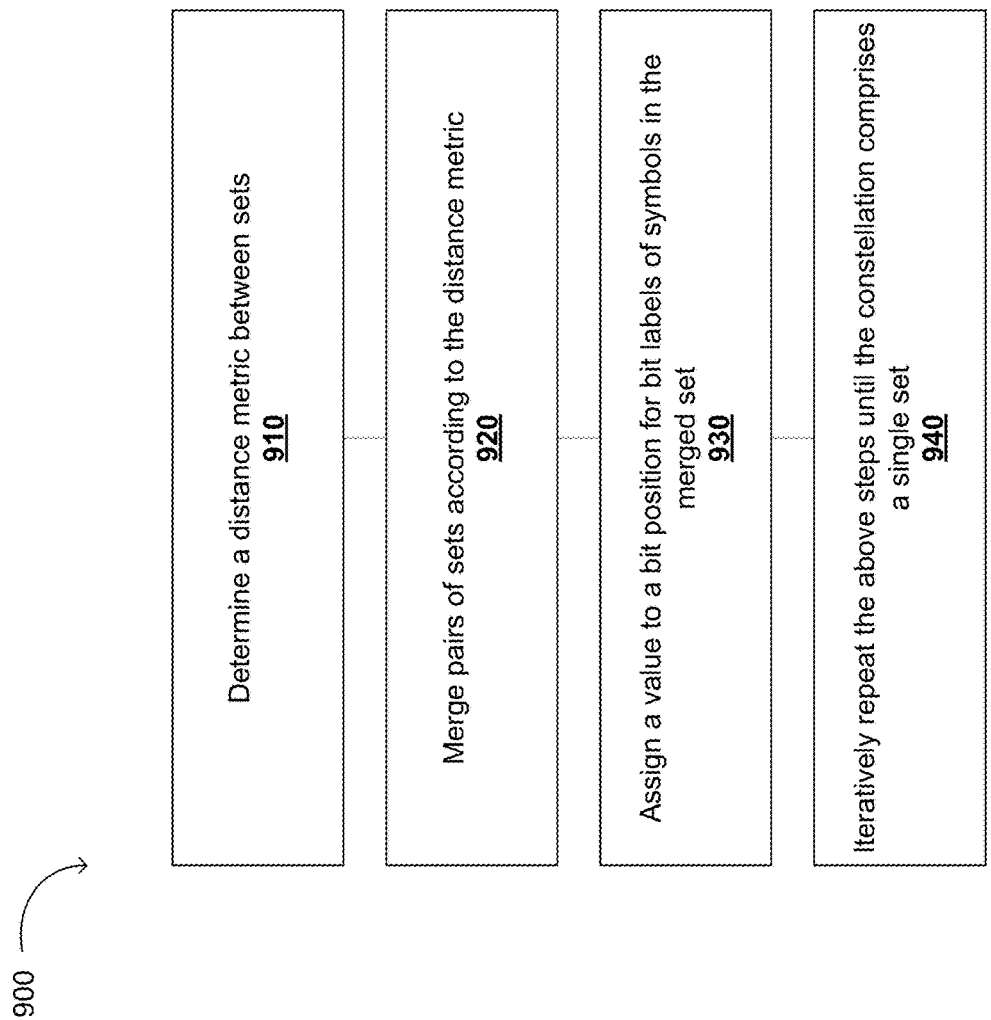
FIG. 9 is a flow chart illustrating a method for mapping bit labels to each of a plurality of symbols in a constellation, according to an embodiment.

Referring to FIG. 9, there is shown a flow chart illustrating a method 900 for mapping bit labels to each of a plurality of symbols in a constellation, according to an embodiment. In contrast to the set partitioning method shown in FIG. 3, method 900 operates on the principle that the constellation is initially organisable into a plurality of sets each having one symbol of the plurality of symbols. The sets are then successively merged and assigned bit positions in each bit label, until a single set containing all the symbols is deduced with bit labels for each symbol. Accordingly, method 900 may be used for mapping 3-dimensional constellations and irregular constellations, in contrast to that shown in FIG. 3 where it would difficult to provide such a mapping. The mapping may then be used, for example by symbol mapper 114 in order to map encoded bits into symbols for transmission over a communications channel 120. As shown in FIG. 9, at step 910 a distance metric between sets is determined. As will be explained in further detail below, the distance metric can dynamically change upon each iteration of method 900, or it may remain static. At step 920, pairs of sets are merged according to the distance metric. For example, pairs of sets that are approximately separated by the distance metric, or closest to the distance metric can be merged. At step 930, a value is assigned to a bit position for bit labels of symbols in the merged set. Finally, at step 940, the above steps are iteratively repeated until the constellation comprises a single set containing all the symbols.

Figure 10:
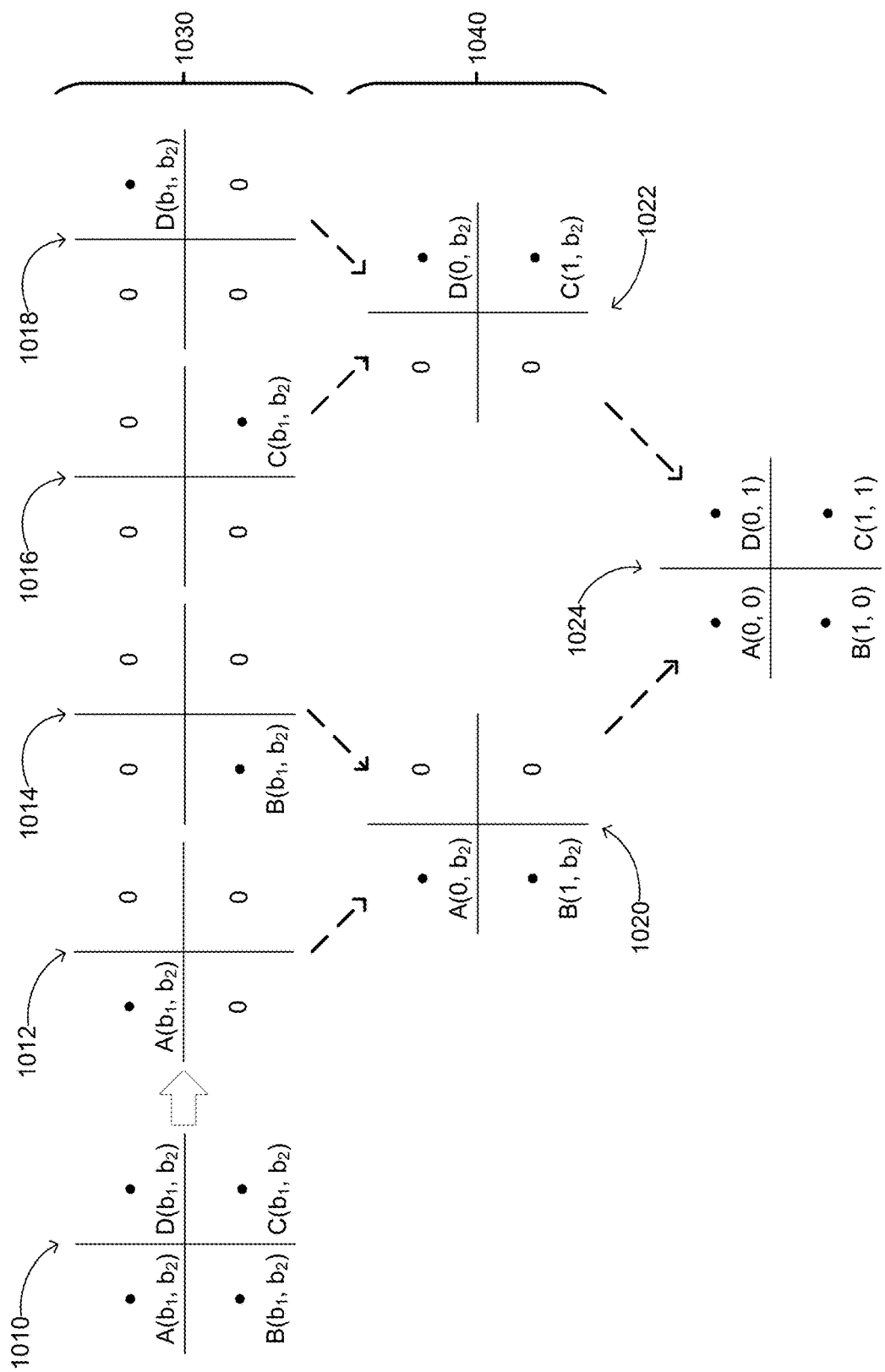
FIG. 10 is a constellation used for illustrating the method of FIG. 9, according to an embodiment.

Referring to FIG. 10, there is shown a constellation 1010 for illustrating method 900 above, according to an embodiment. The constellation 1010 comprises 4 symbols: A, B, C, and D, that are to be assigned corresponding bit labels ($b_1$, $b_2$) as shown. The constellation 1010 is organisable into four distinct sets containing one symbol each as shown with reference numeral 1030: set 1012 (with symbol A(($b_1$, $b_2$))), set 1014 (with symbol B($b_1$, $b_2$)), a set 1016 (with symbol C(($b_1$, $b_2$))), and set 1018 (with symbol D(($b_1$, $b_2$))). At step 910, the distance metric d between sets is determined and shown adjacent set 1012. At step 920 pairs of sets are merged according to the distance metric as shown with reference numeral 1040. Namely, sets 1012 and 1014 are merged into set 1020, and sets 1016 and 1018 are merged into set 1022, as they are respectively separated by approximately the distance metric. At step 930, values are assigned to bit positions of bit labels for symbols in the merged set; namely, in merged set 1020, bit position $b_1 = 0$ for symbol A (i.e. A(0, $b_2$)) and bit position $b_1 = 1$ for symbol B (i.e. B(1, $b_2$)). In merged set 1022, bit position $b_1 = 0$ for symbol D (i.e. D(0, $b_2$)) and bit position $b_1 = 1$ for symbol C (i.e. C(1, $b_2$)). As shown, different values are assigned for the bit positions of the bit label for each symbol is assigned a different value upon merging, so that each symbol in the merged set may be differentially distinguished via their bit labels. Then at step 940, the above steps are iteratively repeated until a single set containing all symbols are created. In this case, since the distance metric d is static, this involves repeating step 920, by merging of sets 1020 and 1022 into set 1024 (shown in reference numeral 1050), and repeating step 930 by assigning values to bit position $b_2$ for bit labels of symbols of merged set 1024. As shown, bit position $b_2$ is assigned a value of 0 ($b_2 = 0$) for symbols A and B, and bit position $b_2$ is assigned a value of 1 ($b_2 = 1$) for symbols C and D. Accordingly, a single set comprising all symbols is derived with corresponding bit labels A(0,0), B(1,0), C(1,1), and D(0,1) for each, and method 900 now ends.

In certain embodiments, when a first set and a second set are merged during step 920, a first value is assigned to the bit position for bit labels corresponding to symbols from the first set, and a second value is assigned to the bit position for bit labels corresponding to symbols from the second set in step 930. As shown in FIG. 10 for merged set 1020 for example, bit position $b_1 = 0$ for symbol A, and bit position $b_1 = 1$ for symbol B.

In certain embodiments, the value in step 930 is assigned to a different bit position upon each iteration in step 940. A shown in FIG. 10 for example, in the first iteration (resulting in group of sets 1040), values are assigned for bit position $b_1$, and in the second iteration (resulting in set 1024), values are assigned for bit position $b_2$. This may be incrementally performed until values are assigned to all bit positions ($b_1, \ldots, b_n$) for bit labels of symbols.

In certain embodiments, the distance metric in step 910 may be determined in accordance with distances between sets of symbols within the constellation. In embodiments where sets comprise multiple symbols, the distance between sets may be defined as the minimum distance between any two symbols of respective sets, for example. The distance metric in step 910 can be determined by: i) for all sets, determining a farthest distance from one set to another set; and ii) selecting the distance metric as the minimum value from each of the farthest distances determined in step i) above. In sub-step i) above, all distances between a set and other sets can be determined, and the farthest distance can be the largest value from all the distances.

In certain embodiments, the distances are determined according to a Euclidian distance given by: $D(i,j) = \|X_i - X_j\|^2$, where $D(i,j)$ = distance between symbols i and j, $X_i$ = coordinates of symbol i, $X_j$ = coordinates of symbol j. This may be suitable for applications involving coherent detection. Alternatively, the distances can be determined according to a chordal Frobenius norm given by: $D(i,j) = \sqrt{2N_T - \text{Tr}\{\Sigma X_i^T X_j\}}$, where $\Sigma X_i^T X_j$ is a diagonal matrix containing the singular values of $X_i^T X_j$, $N_T$ is the number of transmit antennas and Tr is the trace of a matrix (the sum of the elements on the diagonal of the matrix); this may be suitable for non-coherent detection of Grassmannian signals, for example.

In certain embodiments, in step 920, sets that are approximately separated by the distance metric are merged. For example, sets that are approximately spaced by the distance metric are selectively paired together, and then merged together.

In some embodiments, step 940 of iteratively repeating above steps comprises iteratively repeating steps 920 to 930. In other embodiments, it comprises iteratively repeating steps 910 to 930, such that the distance metric in step 910 is updated for every iteration.

Figure 11:
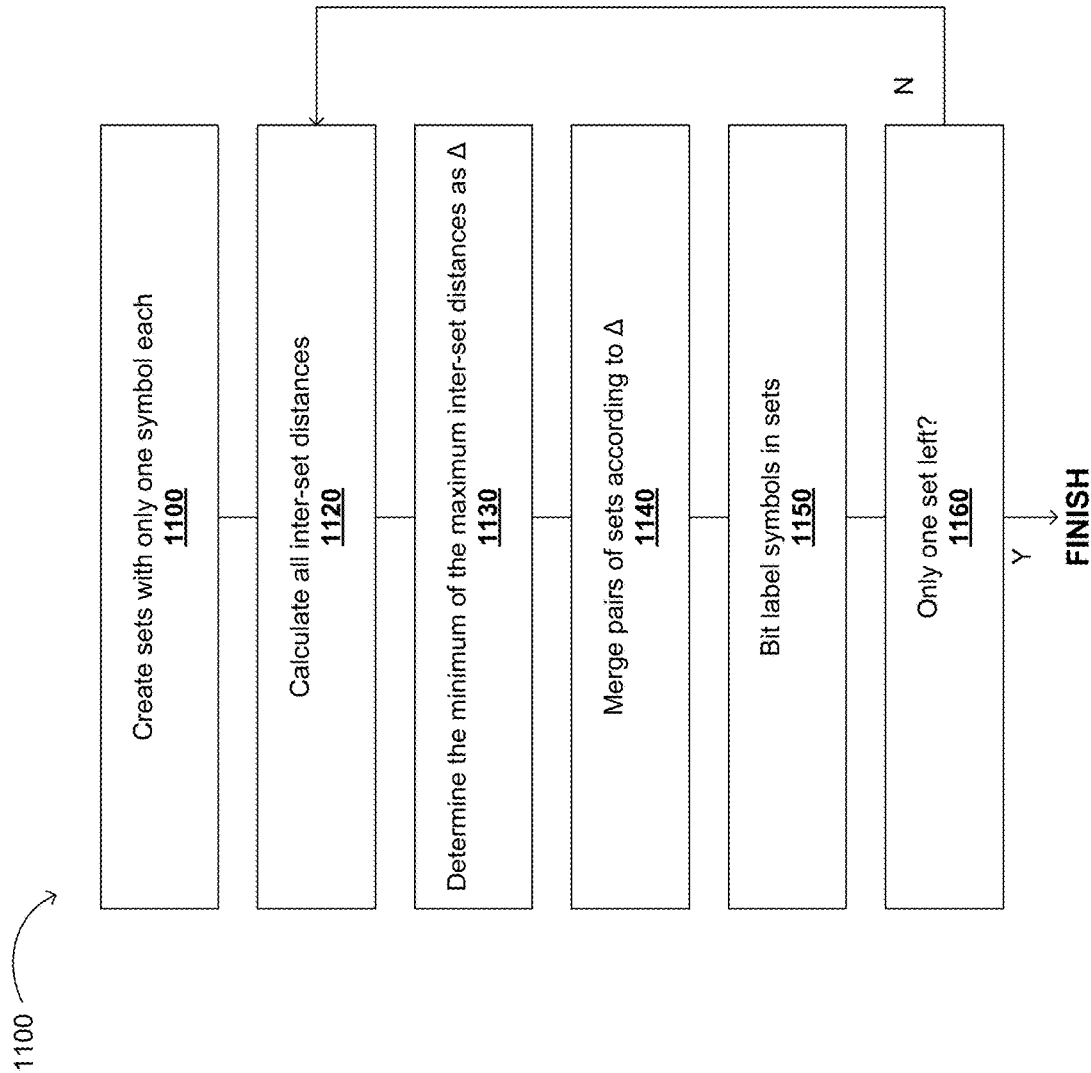
FIG. 11 is a flow chart illustrating a method for mapping bit labels to each of a plurality of symbols in a constellation, according to another embodiment.

FIG. 11 is a flow chart illustrating a method 1100 for mapping bit labels to each of a plurality of symbols in a constellation, according to another embodiment. At step 1110, sets are created initially with only 1 symbol each. At step 1120, all inter-set distances are calculated (e.g. $D(i,j)$ is the distance between set i and set j). The inter-set distance between two sets is defined as the minimum of distances between the symbols in one set and the symbols in the other. At step 1130, the distance to a farthest set is determined for every set of the constellation. The minimum distance of these determined distances may be found as $\Delta = \min_i \max_j D(i,j)$. At step 1140, sets are then merged with the closest set distanced by at least $\Delta$. For example, set i is paired with set $j = \min D(i,j)$, where $D(i,j) \geq \Delta$. At step 1150, symbols in the sets are bit labelled. For example, the symbols in set i are labelled with a bit value of 0, and the symbols in set j are labelled with a bit value of 1. Upon merging (combining) the pairs of sets together, new sets are created containing all the symbols from both previous sets. The number of sets in the constellation is halved, and each set contains twice the number of symbols. At step 1160, the number of subsets is determined, and if there is more than one subset, the method is repeated from step 1120 until only one set remains containing all symbols of the constellation.

FIG. 12 is an example of pseudo code that may be written based on the method 1100 described in FIG. 11, according to an embodiment. Specifically, code segments representative of steps 1130, 1140, and 1150 are highlighted on FIG. 12.

Figure 13B:
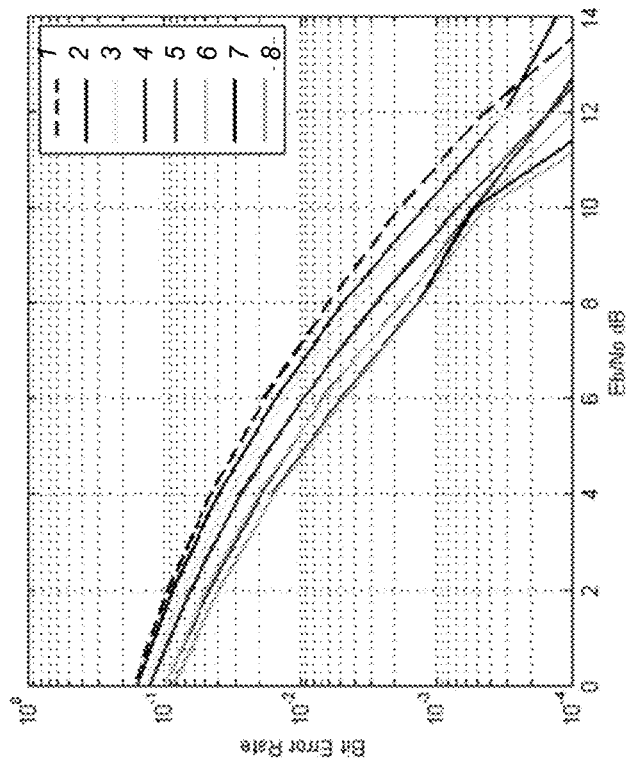
FIGS. 13A-13B illustrate bit error rates for bits of a transmitted symbol when set mapped using the method in FIG. 9 compared to Gray labelling, according to an embodiment.
Figure 13A:
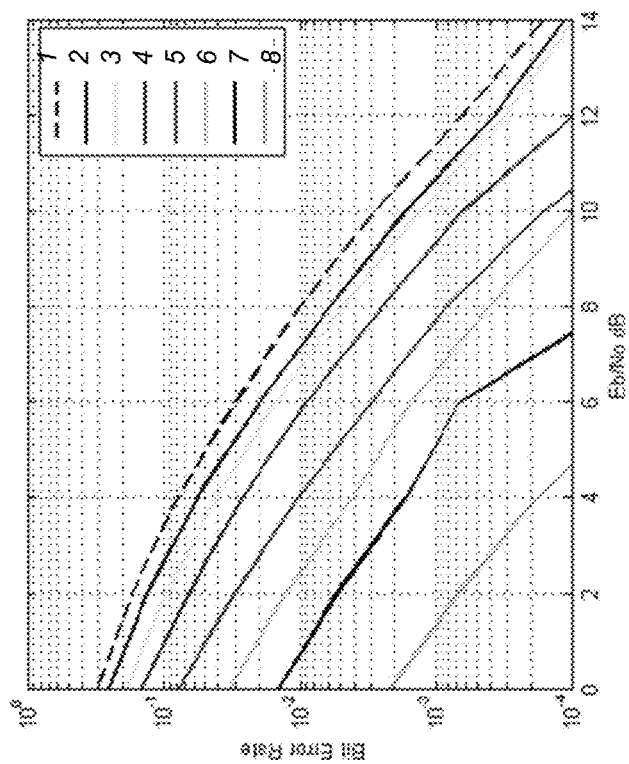
Figure 14A:
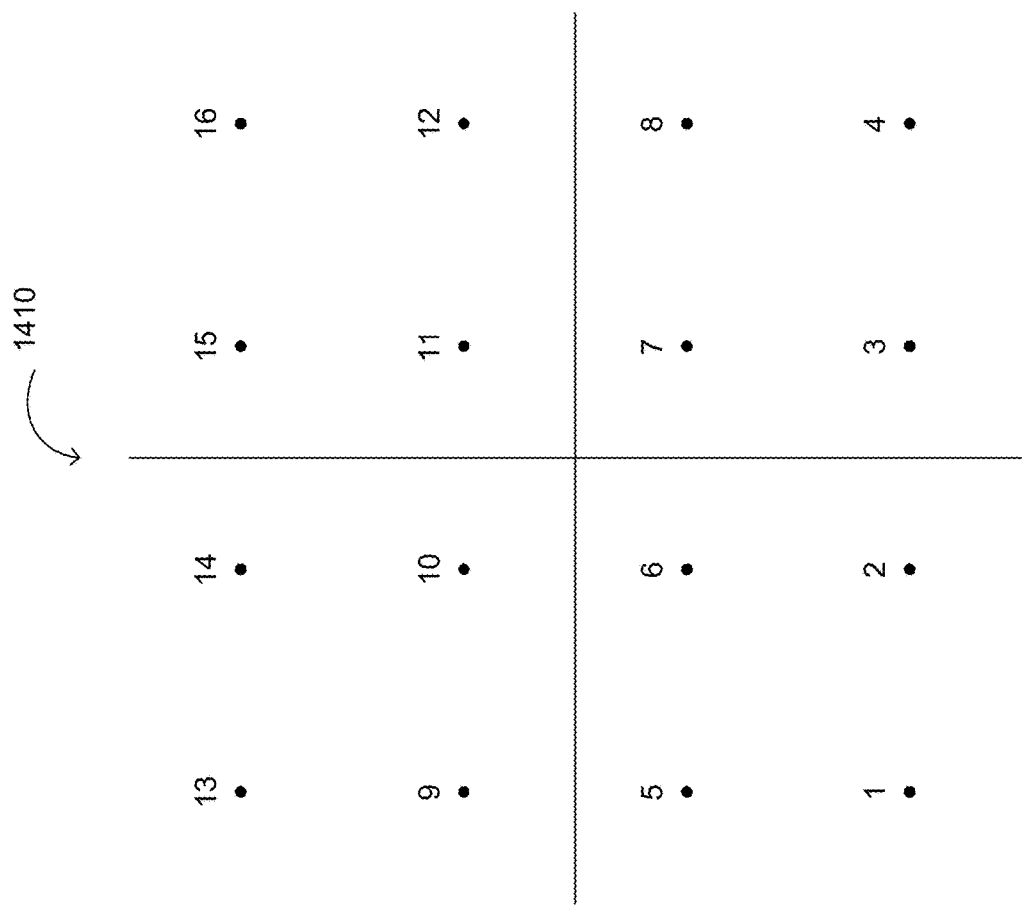
Figure 14B:
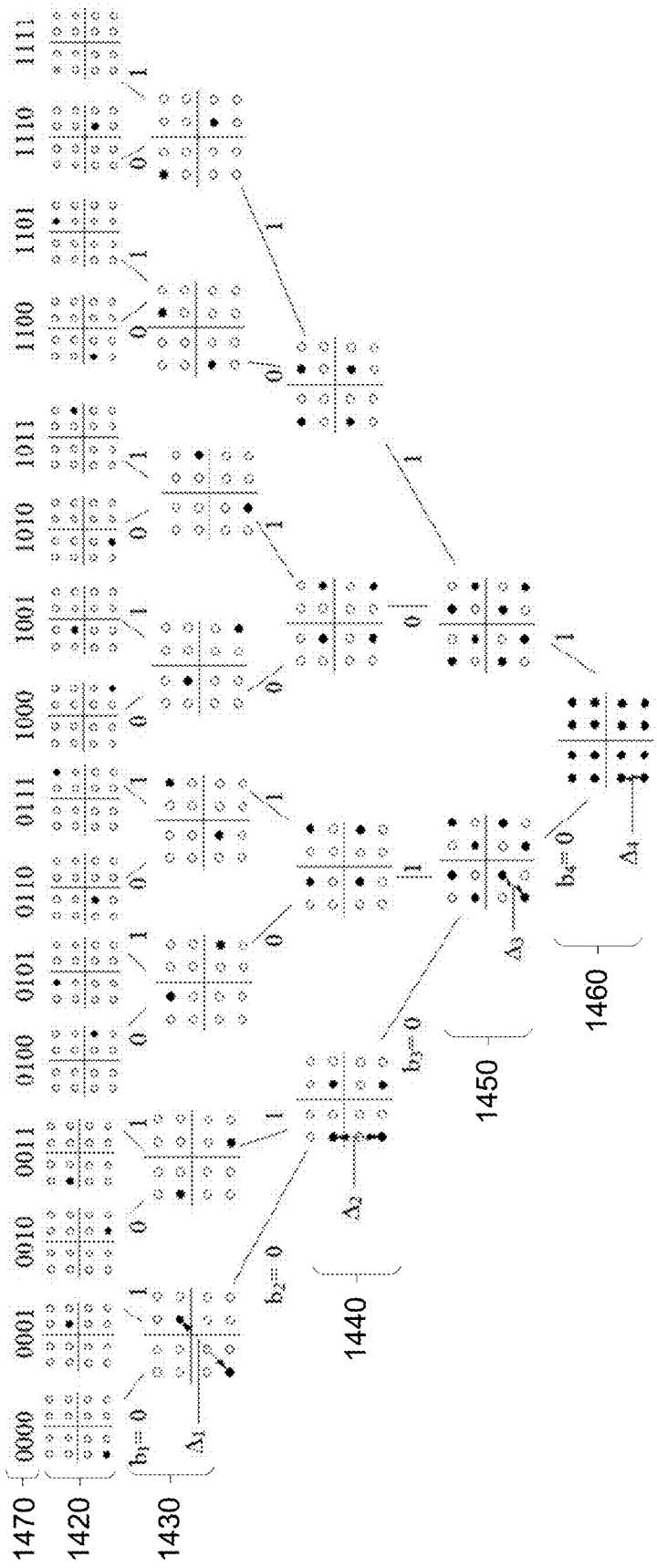

FIGS. 13A-13B illustrate bit error rates for bits of a transmitted symbol when set mapped using method 900 (FIG. 13A), compared to Gray labelling (FIG. 13B), according to an embodiment. As shown in FIG. 13A, each bit (1,2,3,4,5,6,7,8) in the symbol maintains a discernibly different error probability when the method 900 is applied. This is in contrast to FIG. 13B, where each bit exhibits relatively similar bit error rates over the given range. As indicated above, the ability to separate and discern bits according to their relatively error probability, allows for a encoding scheme to selectively freeze certain bits exhibiting greater probability, and to add redundancies in its place to compensate for potential bit transmission errors.

Referring to FIG. 14A-14F, there is shown a constellation 1410 for illustrating method 900 above, according to another embodiment. This illustration is similar to that shown in FIG. 10, except in that the distance metric D between sets is continually updated upon each iteration. Constellation 1410 comprises sixteen symbols numbered "1-16" as shown, which are to be assigned corresponding bit labels ($b_1, b_2, b_3, b_4$). The constellation 1410 is organizable into sixteen distinct sets containing one symbol each as shown with reference numeral 1420. At step 910, distance metric $D_1$ between sets is determined by calculating all distances between symbols of one set and another, as shown through table 1480 in FIG. 14C. The filled boxes indicate the maximum distance between one particular symbol and another symbol. For example, the maximum distance between symbol "1" and any other symbol is $2\sqrt{18}$ to symbol "16", the maximum distance between symbol "2" and any other symbol is $2\sqrt{13}$ to symbol "16", and so forth. From table 1480 in FIG. 14C, the minimum of the maximum distances (i.e. the minimum value of the filled boxes) is then chosen as the distance metric $D_1 = 4\sqrt{2}$. At step 920, sets 1420 that are approximately spaced by the distance metric $D_1 = 4\sqrt{2}$ are merged together and shown as sets 1430. At step 930, values are assigned to bit position $b_1$ for bit labels of symbols in sets 1430, as shown. At step 940, the steps 910-930 are iteratively repeated because there are 8 sets remaining (shown as sets 1430).

Repeating step 910 for the next iteration, next distance metric $D_2$ between sets is again determined by calculating all distances between symbols of one set and another of sets 1430, as shown in table 1482 of FIG. 14D, with distance metric $D_2$ chosen as the minimum of the maximum distances (i.e. the minimum value of the filled boxes) as $D_2 = 4$. At step 920, sets 1430 that are approximately spaced by the new distance metric $D_2 = 4$ are merged together and shown as sets 1440. At step 930, values are assigned to bit position $b_2$ for bit labels of symbols in sets 1440, as shown. At step 940, the process is again iteratively repeated because there are still 4 sets remaining (shown as sets 1440).

For brevity in illustrating subsequent iterations of steps 910-930 in deducing sets 1450 and set 1460, selection of subsequent distance metrics $D_3 = 2\sqrt{2}$ and $D_4 = 2$ are simply shown in FIGS. 14E and 14F and chosen in a similar manner as above. Upon merging of sets to a single set 1460, symbols in set 1460 will each have corresponding bit labels ($b_1, b_2, b_3, b_4$) assigned as shown as bit labels 1470.

Figure 15:
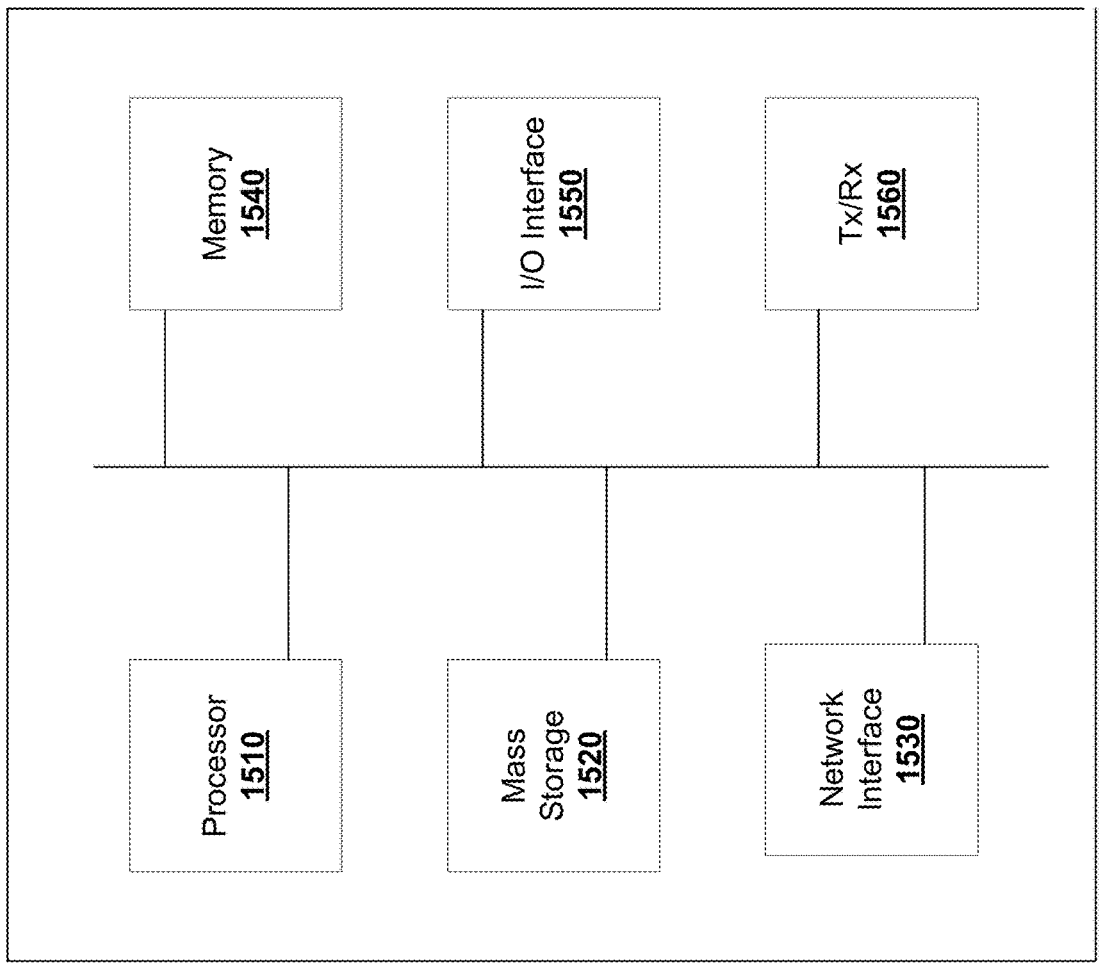
FIG. 15 is a schematic diagram of a hardware device, according to an embodiment.

FIG. 15 is a schematic diagram of a hardware device that may comprise elements of the communications network 100. For example, it may comprise the transmitting node 110, encoder 112, symbol mapper 114, receiving node 130, symbol de-mapper 132, and decoder 134, or embody the operations performed via Code Design function 720 and Set Partitioning function 760 in FIG. 7, for example. As shown, the hardware device includes a processor 1510, memory 1540, non-transitory mass storage 1520, I/O interface 1550, network interface 1530, and a transceiver 1560, all of which are communicatively coupled via bi-directional bus. According to certain embodiments, any or all of the depicted elements may be utilized, or only a subset of the elements. Further, the hardware device may contain multiple instances of certain elements, such as multiple processors, memories, or transceivers. Also, elements of the hardware device may be directly coupled to other elements without the bi-directional bus.

The memory 1540 may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory 1540 or mass storage 1520 may have recorded thereon statements and instructions executable by the processor for performing the aforementioned functions and steps of each element.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for transmission of data across a communications channel, the method executed by a wireless transmitter, the method comprising:
   determining a design Signal-to-Noise Ratio (SNR) at some value between a low limit SNR and a high limit SNR;
   determining an encoding scheme for operation at the design (SNR) utilizing a code design function of the wireless transmitter;
   evaluating a Frame Error Rate (FER) of the encoding scheme;
   if the FER is not within a predetermined target range, modifying the encoding scheme by the code design function by modifying the design SNR until the evaluated FER is within the predetermined target range; and
   transmitting the data using the encoding scheme across the communications channel.

2. The method of claim 1 wherein modifying the encoding scheme further comprises:
   comparing the evaluated FER to the target FER;
   replacing the design SNR with a new design SNR if the evaluated FER is outside the predetermined range to the target FER; and
   iteratively repeating the steps of: determining the encoding scheme, evaluating the FER, and modifying the encoding scheme.

3. The method of claim 1 wherein the design SNR is between a low limit SNR and a high limit SNR, and modifying the encoding scheme further comprises:
   comparing the evaluated FER to the target FER;
   updating the design SNR with the low limit SNR when the evaluated FER is greater than the target FER;
   updating the design SNR with the high limit SNR when the evaluated FER is lower than the target FER;
   determining whether the absolute difference between the high limit SNR and the low limit SNR is less than a predetermined tolerance; and when the absolute difference between the high limit SNR and the low limit SNR is greater than the predetermined tolerance,
   iteratively repeating the steps of: determining the encoding scheme, evaluating the FER, and modifying the encoding scheme.

4. The method of claim 3 wherein the design SNR is selected to be a median value between the low limit SNR and the high limit SNR.

5. The method of claim 3 wherein low limit SNR and the high limit SNR are predetermined values selected in accordance with the communications channel.

6. The method of claim 1, wherein the encoding scheme is for application with a multilevel polar encoder comprising a plurality of encoding banks, and determining the encoding scheme comprises determining a plurality of sub-codes each corresponding to one of the plurality of encoding banks.

7. The method of claim 6 wherein each of the plurality of sub-codes determines frozen bit channels within each encoding bank.

8. The method of claim 7 wherein the frozen bit channels correspond to bit channels having relatively higher error probabilities upon transmission of the encoded data.

9. The method of claim 1 wherein the encoding scheme is for a polar encoder comprising a plurality of bit channels, and determining the encoding scheme comprises selectively freezing one or more of the plurality of bit channels of the polar encoder.

10. The method of claim 9 further comprising transmitting message frames representative of encoded bits from the polar encoder to determine the one or more of the plurality of bit channels to selectively freeze.

11. The method of claim 9 wherein the message frames are determined from a mapping provided by a set partitioning function.

12. A method for transmission of data across a communications channel using a plurality of symbols in a constellation, the constellation organisable into a plurality of sets each corresponding to a symbol of the plurality of symbols, the method executed by a wireless transmitter, the method comprising:
   determining a distance metric between sets;
   merging pairs of sets according to the distance metric;
   assigning a value to a bit position for bit labels of symbols in the merged set;
   iteratively repeating the above steps until the constellation comprises a single subset;
   mapping bit labels to a plurality of symbols in the constellation, wherein each bit label comprises a plurality of bit positions; and
   transmitting the data across a communications channel using the plurality of symbols.

13. The method of claim 12, wherein when a first set and a second set are merged a first value is assigned to the bit position for bit labels corresponding to symbols from the first set, and a second value is assigned to the bit position for bit labels corresponding to symbols from the second set.

14. The method of claim 12 wherein for each iteration the value is assigned to a different bit position.

15. The method of claim 12 wherein determining the distance metric includes:
   for each set, determining a farthest distance to another set; and
   selecting the distance metric as the minimum value of the farthest distances determined.

16. The method of claim 15 wherein the farthest distance is determined according to a Euclidian distance formula given by: $D(i,j)=\|X_i-X_j\|^2$, where $D(i,j)$ is the distance between symbols i and j, Xi represents the position of symbol i, and Xj represents the position of symbol j.

17. The method of claim 15 wherein the farthest distance are determined according to a chordal Frobenius norm given by: $\Sigma D(i,j) = \sqrt{2N_T - \mathrm{Tr}(\mathrm{Tr}\{\Sigma X_i^T X_j\}}$, where $\Sigma X_i^T X_j$ is a diagonal matrix containing singular values of $X_i^T X_j$, $N_T$ is the number of transmit antennas in a transmitting node, and Tr is the trace of the diagonal matrix.

18. The method of claim 12 wherein merging pairs of sets includes merging sets approximately separated by the distance metric.

19. The method of claim 12 wherein iteratively repeating the above steps comprises iteratively repeating merging pairs of sets and assigning a value iteratively.

20. The method of claim 12 wherein iteratively repeating the above steps comprises iteratively repeating determining a distance metric, merging pairs of sets and assigning a value.

21. The method of claim 12 wherein the constellation is a three dimensional constellation or an irregular constellation.

22. A network node for transmission of data across a communications channel, the network node comprising:
- a processor; and
- a memory coupled to the processor and having instructions stored therein, that when executed by the processor causes the network node to implement a code design function used to determine an encoding scheme for operation at a design Signal-to-Noise Ratio (SNR); evaluate a Frame Error Rate (FER) of the encoding scheme; modify the encoding scheme by modifying the design SNR until the evaluated FER is within a predetermined range to a target FER;
- and transmitting the data using the encoding scheme across the communications channel.

23. A network node for transmission of data across a communications channel using a plurality of symbols in a constellation, the constellation organisable into a plurality of sets each corresponding to a symbol of the plurality of symbols, the network node comprising:
- a processor; and
- a memory coupled to the processor and having instructions stored therein, that when executed by the processor causes the network node to:
  - determine a distance metric between sets;
  - merge pairs of sets according to the distance metric;
  - assign a value to a bit position for bit labels of symbols in the merged set;
  - iteratively repeat the above steps until the constellation comprises a single subset;
  - mapping bit labels to a plurality of symbols in the constellation, wherein each bit label comprises a plurality of bit positions; and
  - transmitting the data across a communications channel using the plurality of symbols.

* * * * *